(12) United States Patent
Plett et al.

(10) Patent No.: US 7,258,373 B2
(45) Date of Patent: Aug. 21, 2007

(54) VEHICLE LOCK ASSEMBLY

(75) Inventors: Matthew Plett, Worthington, OH (US);
Steven Thiele, Marysville, OH (US);
Kenichi Kitayama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 10/895,209

(22) Filed: Jul. 20, 2004

(65) Prior Publication Data

US 2006/0001275 A1 Jan. 5, 2006

Related U.S. Application Data

(60) Provisional application No. 60/585,242, filed on Jun. 30, 2004.

(51) Int. Cl.
B62D 33/37 (2006.01)
(52) U.S. Cl. .............. 292/210; 292/216; 292/DIG. 29; 49/395; 296/50; 296/51
(58) Field of Classification Search .............. 292/201, 292/210, 216, DIG. 23–23, DIG. 65, DIG. 43, 292/DIG. 29, DIG. 17; 49/192–193, 395; 296/50–51, 57.1, 146.8, 146.11, 146.12
See application file for complete search history.

(56) References Cited

U.S. PATENT DOCUMENTS

| | | | |
|---|---|---|---|
| 2,877,038 A | * | 3/1959 | Kramer ...................... 292/216 |
| 3,384,404 A | * | 5/1968 | Slattery ..................... 292/216 |
| 3,387,406 A | | 6/1968 | Coker et al. |
| 3,400,961 A | | 9/1968 | Koch et al. |
| 3,409,321 A | * | 11/1968 | Wolfslayer ................. 292/216 |
| 3,454,299 A | | 7/1969 | Hewitt et al. |
| 3,567,274 A | | 3/1971 | Kaptur, Jr. et al. |
| 3,592,504 A | | 7/1971 | Sandor |
| 3,623,764 A | * | 11/1971 | Jacobus ..................... 292/216 |
| 3,645,043 A | | 2/1972 | Velavicius et al. |
| 3,692,343 A | * | 9/1972 | Meyer ....................... 292/216 |

(Continued)

FOREIGN PATENT DOCUMENTS

JP         50-3533         2/1975

(Continued)

*Primary Examiner*—Brian E. Glessner
*Assistant Examiner*—Christopher Boswell
(74) *Attorney, Agent, or Firm*—Fay Sharpe LLP

(57) ABSTRACT

A lock assembly for selectively locking to a striker on a vehicle includes a lock body defining a lock body recess for receiving the striker therein. A latch is rotatably mounted to the lock body for selectively locking the striker in the lock body recess. The latch is moveable between a latched position wherein the striker is locked in the lock body recess and an unlatched position wherein the striker is removable from the lock body recess. A ratchet is rotatably mounted to the lock body adjacent the latch for selectively locking the latch in the latched position. The ratchet is moveable between an engaged position wherein the ratchet locks the latch in the latched position and a disengaged position wherein the latch is moveable between the latched position and the unlatched position. The ratchet is (a) in the engaged position when locking the latch in the latched position to lock the striker in the lock body recess and (b) in the disengaged position when the latch is one of (i) in the unlatched position and (ii) moveable between the latched position and the unlatched position.

11 Claims, 32 Drawing Sheets

U.S. PATENT DOCUMENTS

| | | |
|---|---|---|
| 3,749,440 A | 7/1973 | Lathers |
| 3,998,482 A * | 12/1976 | Nozaki et al. ............... 292/216 |
| 4,076,301 A | 2/1978 | Gergoe |
| 4,157,844 A | 6/1979 | Sarosy et al. |
| 5,040,390 A | 8/1991 | Mistry et al. |
| 5,265,450 A | 11/1993 | Doyle |
| 5,433,039 A | 7/1995 | Hawkins et al. |
| 5,556,152 A | 9/1996 | Dunlap et al. |
| 5,639,130 A * | 6/1997 | Rogers et al. ............... 292/216 |
| 6,017,067 A | 1/2000 | Yoneyama et al. |
| 6,030,019 A | 2/2000 | Stiltner et al. |
| 6,220,649 B1 * | 4/2001 | Rife ........................ 296/146.8 |
| 6,390,527 B1 | 5/2002 | Leftridge |
| 6,502,868 B1 | 1/2003 | Laspa et al. |
| 6,779,820 B2 * | 8/2004 | Ogino ........................ 292/216 |
| 6,805,393 B1 * | 10/2004 | Stevenson et al. ........ 296/146.8 |
| 7,150,486 B2 * | 12/2006 | Ichinose ....................... 296/51 |
| 7,165,800 B2 * | 1/2007 | Thiele et al. .................. 296/50 |
| 2002/0158473 A1 * | 10/2002 | Ogino ........................... 292/44 |

FOREIGN PATENT DOCUMENTS

| | | |
|---|---|---|
| JP | 57-095215 | 6/1982 |
| JP | 61-12070 | 4/1986 |
| JP | 61-12071 | 4/1986 |
| JP | 61-58629 | 12/1986 |
| JP | 62-108480 | 7/1987 |

* cited by examiner

VEHICLE LOCK ASSEMBLY

CROSS-REFERENCES TO RELATED PATENT APPLICATIONS

This application claims priority of Provisional Patent Application Ser. No. 60/585,242, filed Jun. 30, 2004, entitled "DUAL MODE TAILGATE CONTROL SYSTEM". This application is related to pending U.S. patent application Ser. No. 10/894,951, filed concurrently herewith on Jul. 20, 2004, entitled "DUAL MODE TAILGATE CONTROL SYSTEM", commonly assigned to Honda Motor Co., Ltd. and expressly incorporated herein by reference. This application is also related to pending U.S. patent application Ser. No. 10/894,728, filed concurrently herewith on Jul. 20, 2004, entitled "TAILGATE SYNCHRONIZER", commonly assigned to Honda Motor Co., Ltd. and expressly incorporated herein by reference.

BACKGROUND

The present invention relates to tailgates and, more particularly, to a control system for a dual-mode tailgate. In one embodiment, the tailgate control system is provided for controlling a dual-mode tailgate mounted to a sport utility truck or vehicle and will be described with particular reference thereto. It is to be appreciated, however, that the invention may relate to other similar environments and applications.

Tailgates and, more particularly, dual-mode tailgates are generally known. For example, U.S. Pat. No. 3,387,406 issued to Coker discloses a dual-mode tailgate for use on a station wagon. "Dual-mode" refers to the two directions or pivot axes along which a dual-mode tailgate is openable. Often, the dual-mode tailgate is selectively openable in a first, fold-down direction about an axis generally parallel with a rear edge of the vehicle along which the tailgate is disposed (e.g., similar to a conventional pick-up truck tailgate). The dual-mode tailgate is also selectively openable in a second, side-to-side direction about an axis generally parallel with a vertical edge defining the opening in which the tailgate is disposed.

Generally, a dual-mode tailgate includes a dual-mode hinge pivotally connecting the tailgate to a vehicle, a first hinge/lock assembly spaced apart from the dual-mode hinge in a first direction and a second hinge/lock assembly spaced apart from the dual-mode hinge in a second direction. For example, the dual-mode hinge is positioned in a lower-left corner of the tailgate, the first hinge/lock assembly is positioned in an upper-left corner of the tailgate and the second hinge/lock assembly is positioned in a lower right corner of the tailgate.

When the first hinge/lock is detached from the vehicle, the tailgate is openable in a first mode (e.g., flip-down mode) wherein the second hinge/lock and the dual-mode hinge cooperate to pivotally connect the tailgate to the vehicle along a first axis (e.g., an axis generally parallel with a bottom edge of an opening in which the tailgate is disposed). When the second hinge/lock is detached from the vehicle, the tailgate is openable in a second mode (e.g., swing-open mode) wherein the first hinge/lock assembly and the dual-mode hinge cooperate to pivotally connect the tailgate to the vehicle along a second axis (e.g., an axis generally parallel with a vertical edge of an opening in which the tailgate is disposed). Often, a conventional lock assembly is provided in a corner of the tailgate cater-corner or diagonally opposite the dual-mode hinge to further secure the tailgate to the vehicle when the tailgate is in a closed position.

To prevent damage to the vehicle and the tailgate, as well as injury to an operator of the tailgate, the dual-mode tailgate is preferably prevented from operating in both of its modes simultaneously, i.e., the first and second hinge/lock assemblies are not allowed to both be detached from the vehicle simultaneously. For this purpose, conventional lock assemblies often require an electronic sensor to communicate the status, locked or unlocked, of the lock assembly. The communicated status can then be used in determining whether another lock assembly should be allowed to be unlocked. One problem with this arrangement is that electronic sensors may fail to function if power supplied by a vehicle, to which the lock assemblies are mounted, is disrupted. Some prior art lock assemblies function without electronics or electronic sensors and are used for determining whether another locking assembly is allowed to be unlocked. However, these lock assemblies tend to be relatively complicated requiring an extraordinary number of parts and/or include complex parts that are often difficult to manufacture. Moreover, the locking assembly itself is typically not used in determining the status of the locking assembly. Thus, there is a need for a simplified lock assembly that functions without the use of electronics to communicate its status for determining if another lock assembly should be allowed to be unlocked.

BRIEF SUMMARY

In accordance with one aspect, a lock assembly is provided for selectively locking to a striker on a vehicle. More particularly, in accordance with this aspect, the lock assembly includes lock assembly includes a lock body defining a lock body recess for receiving the striker therein. A latch is rotatably mounted to the lock body for selectively locking the striker in the lock body recess. The latch is movable between a latched position wherein the striker is locked in the lock body recess and an unlatched position wherein the striker is removable from the lock body recess. A ratchet is rotatably mounted to the lock body adjacent the latch for selectively locking the latch in the latched position. The ratchet is movable between an engaged position wherein the ratchet locks the latch in the latched position and a disengaged position wherein the latch is movable between the latched position and the unlatched position. The ratchet is (a) and the engaged position when locking the latch in the latched position to lock the striker in the lock body recess and (b) in the disengaged position when the latch is one of (i) in the unlatched position and (ii) moveable between the latched position and the unlatched position.

In accordance with another aspect, a lock assembly is provided for selectively locking a tailgate to a striker mounted on a vehicle body and is pivotally moveable about the striker. More particularly, in accordance with this aspect, the lock assembly includes a lock body mounted to the tailgate and defining a lock body recess for selectively receiving the striker. A latch is rotatably mounted to the tailgate and is moveable between a latched a position wherein the latch locks the striker in the lock body recess and an unlatched position wherein the striker is removable from the lock body recess. A ratchet is rotatably mounted to the tailgate and moveable between an engaged position wherein the ratchet holds the latch in the latched position and a disengaged position wherein the latch is moveable between the latched position and the unlatched position. The ratchet remains in the disengaged position unless the striker is in the lock body recess and the latch is in the latched position locking the striker in the lock body recess.

In accordance with yet another aspect, a dual-mode tailgate lock assembly is provided. More particularly, in accordance with this aspect, the dual-mode tailgate lock assembly includes a striker mounted to an associated vehicle. A lock body is mounted to the dual-mode tailgate and has a lock body recess for receiving the striker. A latch is rotatably mounted to the lock body for selectively locking the striker in the lock body recess. A ratchet is rotatably mounted to the lock body for selectively locking the latch in a latched position wherein the latch locks the striker in the lock body recess. A locked status or an unlocked status of the striker in the lock body recess is determinable by a position of the ratchet.

BRIEF DESCRIPTION OF THE DRAWINGS

The one or more embodiments may take form in various components and arrangements of components, and in various steps and arrangements of steps. The drawings are only for purposes of illustrating the one or more preferred embodiments and are not to be construed as limiting the invention.

DETAILED DESCRIPTION

Figure 1:
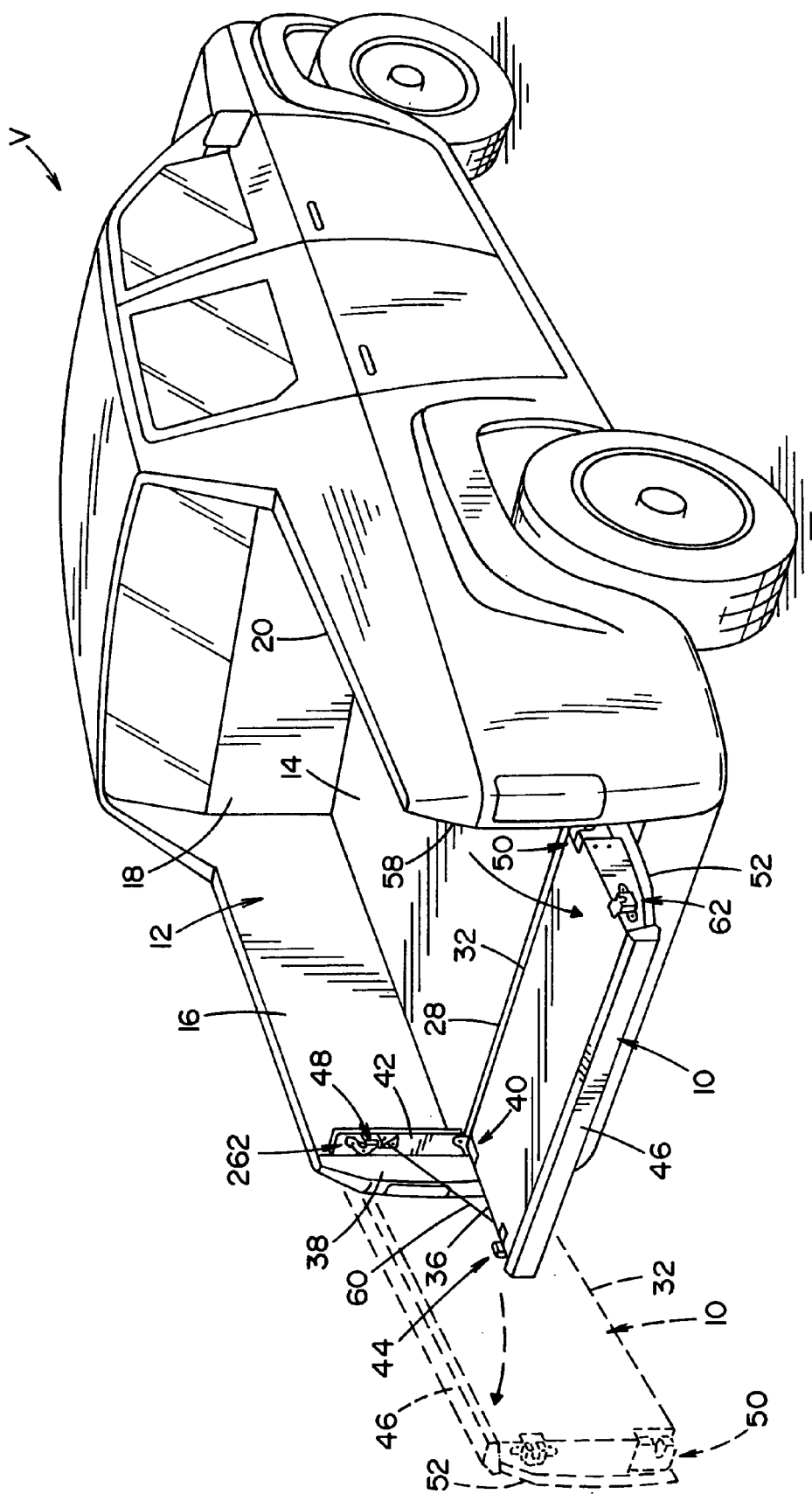
FIG. 1 is a perspective view of a vehicle having a dual-mode tailgate openable to a first, fold-down position and, alternatively, a second, swing-open position.

Referring now to the drawings wherein the showings are for purposes of illustrating one or more embodiments only and not for purposes of limiting the same, with reference to FIG. 1, a closure structure or assembly, such as dual-mode tailgate 10, is shown as a component of a load-carrying bed 12 of a vehicle V. In the illustrated embodiment, the vehicle is a sport utility truck (SUT), but it is to be appreciated by those skilled in the art that the vehicle V could be any other type of vehicle having a bed, such as a pick-up truck, utility truck or other vehicle. Generally, the bed 12 includes a bed floor 14 having a plurality of walls 16,18,20 extending upwardly adjacent three edges thereof and forming a portion of a vehicle body of the vehicle V.

The dual-mode or dual-axis tailgate 10 is positioned along an open, rear edge 28 of the bed floor 14. More particularly, the tailgate 10 extends between the first and second sidewalls 16,20 to selectively close an open end of the load-carrying bed 12. The tailgate 10 is mounted to the vehicle V and is able to pivot about a first axis 30 (FIG. 2) for movement between a closed position and a fold-open position (FIG. 3). In the illustrated embodiment, the first axis 30 is generally horizontal and parallel with the rear edge 28 of the bed floor 14 which defines the opening in which the tailgate 10 is disposed. The tailgate 10 is also alternatively able to pivot about a second axis 34 (FIG. 2) for movement between the closed position and a swing-open position (FIG. 4). In the illustrated embodiment, the second axis 34 is generally vertical and parallel with a first sidewall end 38 which also defines the opening in which the tailgate 10 is disposed. The second axis 34 is generally normal relative to the first axis.

Figure 2:
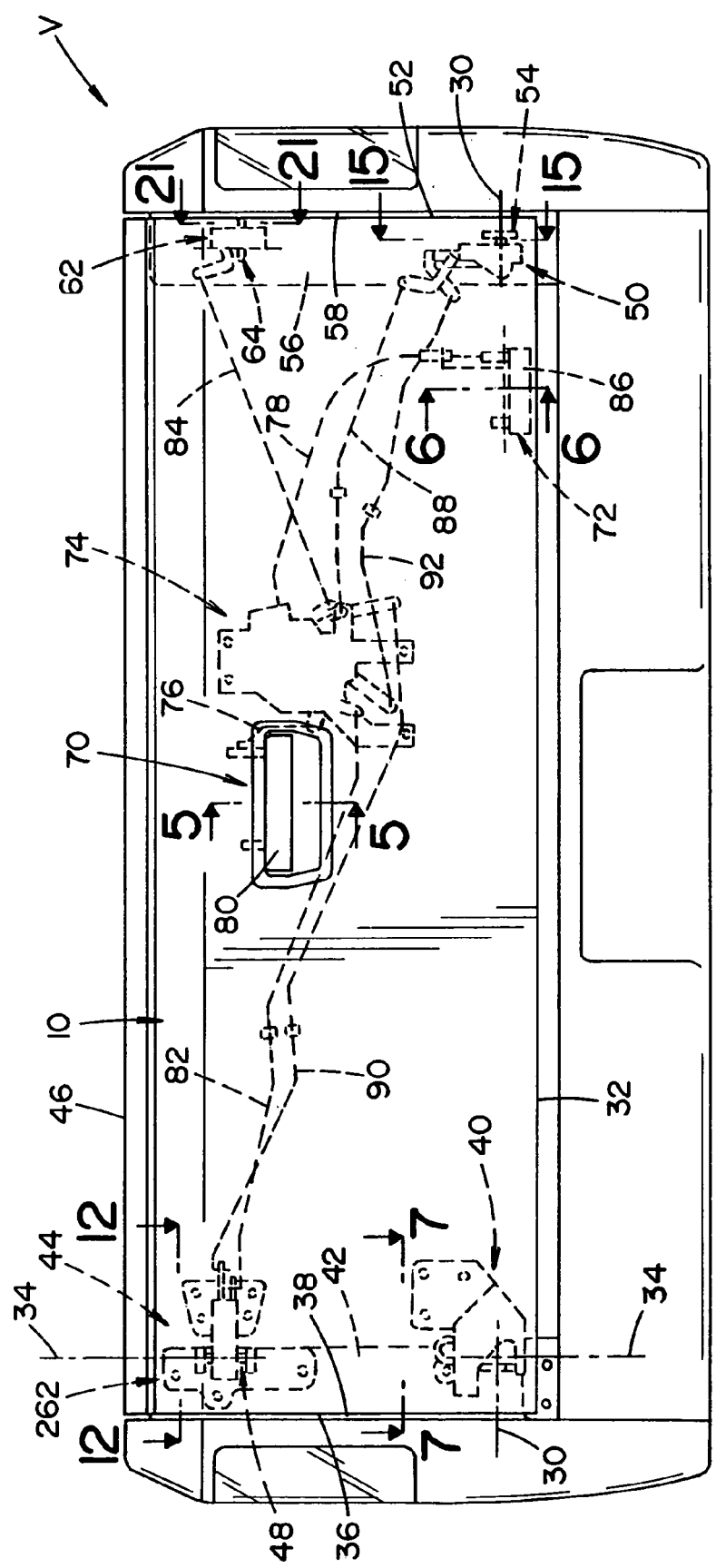
FIG. 2 is a rear elevational view of the tailgate on the vehicle showing a tailgate control system (in hidden lines) for operating the tailgate.
Figure 3:
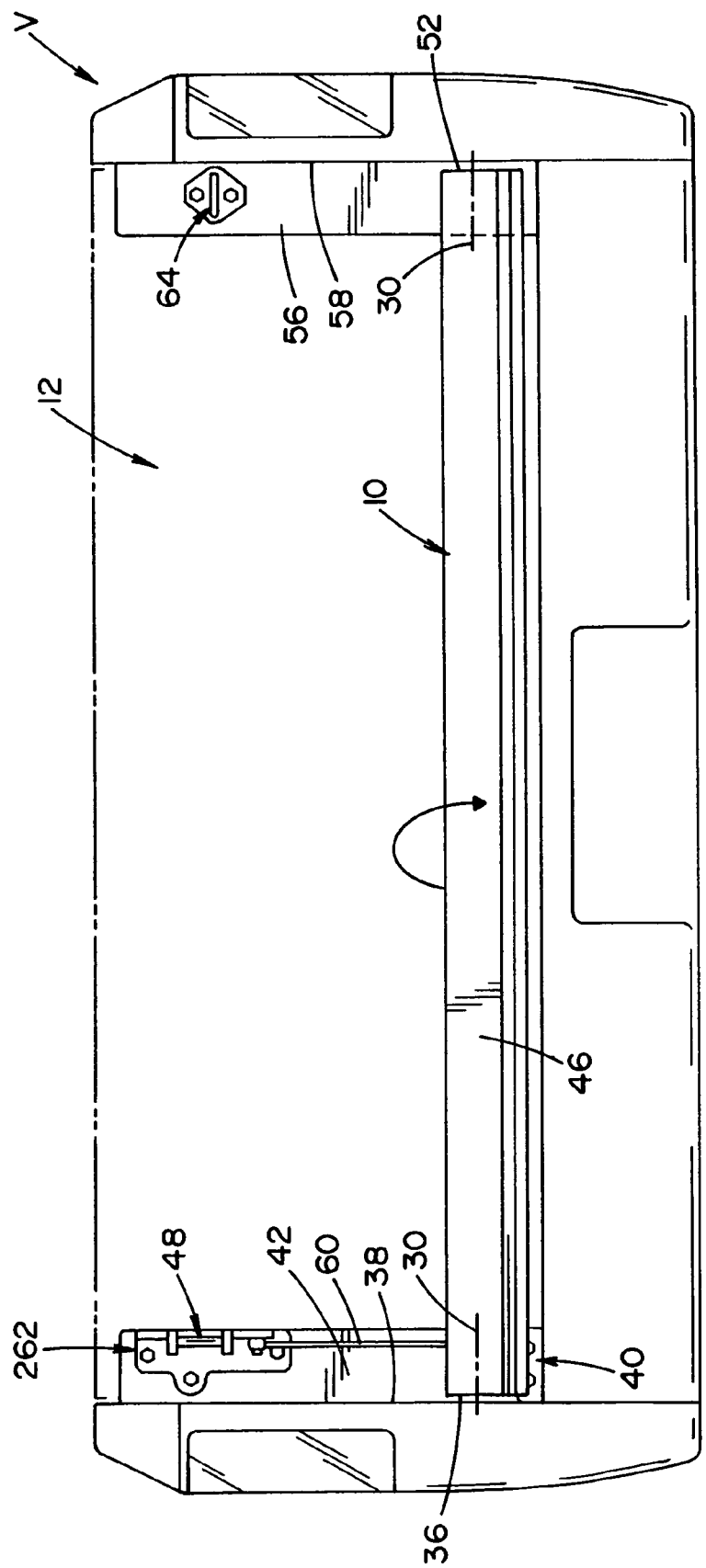
FIG. 3 is a rear elevational view of the tailgate on the truck showing the tailgate in the flip-open position.
Figure 4:
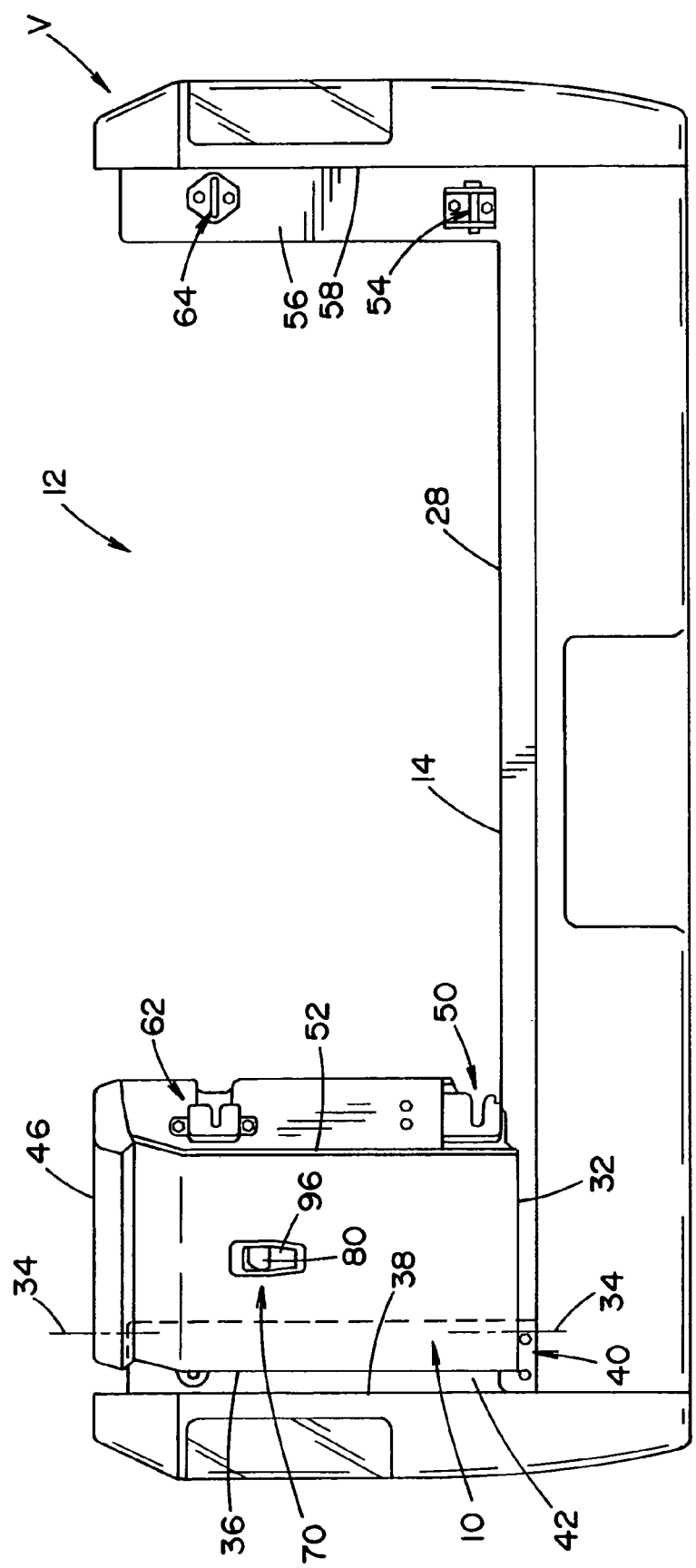
FIG. 4 is a rear elevational view of the tailgate on the truck showing the tailgate in the swing-open position.

To facilitate the dual-mode action of the tailgate 10, with additional reference to FIGS. 2-4, a dual-mode hinge assembly 40 attaches or is mounted to the tailgate 10 at or adjacent a first corner of the tailgate formed at the intersection of the bottom edge 32 and a first lateral edge 36 of the tailgate 10. The dual-mode hinge assembly 40 pivotally connects the tailgate 10, along the first and second axes 30,34, to the vehicle V. More specifically, the dual-mode hinge assembly 40 pivotally connects to a flange or pillar 42 extending from and connected to the first sidewall end 38 adjacent the rear edge 28 of the bed floor 14 for movement about the first axis 30 and alternative movement about the second axis 34. In one embodiment, the dual-mode hinge assembly is the same or similar to that described in commonly owned, U.S. Pat. No. 6,938,941, entitled "Tailgate Dual Mode Hinge With Integrated Checker" and issued on Sep. 6, 2005, which is expressly incorporated herein by reference.

A first hinge/lock assembly 44 attaches or is mounted to the tailgate 10 spaced from the hinge assembly 40 in a first direction. More specifically, the hinge/lock assembly 44 is mounted at or adjacent a second corner of the tailgate formed at the intersection of the first lateral edge 36 and a top edge 46 of the tailgate (upper left corner in FIG. 2). The first hinge/lock assembly 44, also referred to herein as a first lock assembly, selectively latches or locks to a first hinge/lock striker 48 to releasably lock the tailgate 10 to the vehicle V. The first hinge/lock striker is mounted to the pillar 42 above the hinge assembly 40. With additional reference to FIG. 4, when operating as a hinge, the first hinge/lock assembly 44 cooperates with the hinge assembly 40 to pivotally support the tailgate 10 along or about the second axis 34 and allows the tailgate to move between the tailgate closed position and the swing-open position.

A second hinge/lock assembly 50 attaches or is mounted to the tailgate 10 spaced from the hinge assembly 40 in a second direction. More specifically, the hinge/lock assembly 50 is mounted at or adjacent a third corner of the tailgate formed at the intersection of the bottom edge 32 and a second lateral edge 52 of the tailgate (lower right corner in FIG. 2). The second hinge/lock assembly 50, also referred to herein as a second lock assembly, selectively latches or locks to a second hinge/lock striker 54 (FIG. 4) to releasably locking the tailgate 10 to the vehicle V. The striker 54 is mounted to a flange or pillar 56 extending from and connected to a second sidewall end 58 adjacent the rear edge 28 of the bed floor 14. With additional reference to FIG. 3, the second hinge/lock assembly 50 cooperates with the hinge assembly 40 to pivotally support the tailgate 10 along or about the first axis 30 and allows the tailgate to move between the tailgate closed position and the fold-open or flip-down position. A support cable 60 is optionally provided for supporting the tailgate 10 in the flip-down position. The support cable 60 connects to the flange 42 adjacent the first striker 48 and to the first lateral edge 36 of the tailgate 10.

A locking assembly 62, also referred to herein as a third lock assembly, attaches or is mounted to the tailgate 10 at or adjacent a fourth corner of the tailgate formed at the intersection of the top edge 46 and the second lateral edge 52 of the tailgate (upper right corner in FIG. 2). The locking assembly 62 selectively latches to a locking striker 64 to releasably lock the tailgate to the vehicle V. The striker 64 is mounted to the flange 56 above the second hinge/lock striker 54. The tailgate 10 is openable toward or to the fold-open position about the axis 30 when both the first hinge/lock assembly 44 is unlatched from the first hinge/lock striker 48 and the locking assembly 62 is unlatched from the locking striker 64. The tailgate 10 is openable toward or to the swing-open position about the axis 34 when both the second hinge/lock assembly 50 is unlatched from the second hinge/lock striker 54 and the locking assembly 62 is unlatched from the locking striker 64.

The tailgate 10 additionally includes a first or upper handle assembly 70 and a second or lower handle assembly 72. The first or upper handle assembly 70 is centrally mounted to the tailgate 10 for opening thereof in the flip-down mode. The second or lower handle assembly 72 is mounted adjacent the bottom edge 32 of the tailgate 10 for opening thereof in a swing-open mode. A tailgate synchronizer 74 is mounted within the tailgate 10 for mechanically communicating and coordinating operation between the handle assemblies 70,72, the first and second hinge/lock assemblies 44,50 and the locking assembly 62. The synchronizer 74 functions without the use of electrical power enabling the tailgate 10 to be operational even when electrical power is unavailable, such as might occur as the result of a dead battery.

More specifically, as will be described in more detail below, the upper handle assembly 70 communicates with a synchronizer 74 through a rod 76 and the lower handle assembly 72 communicates with the synchronizer 74 through a cable 78 (rod 76 and cable 78 shown schematically in FIG. 2). The synchronizer 74 selectively allows a handle 80 of the upper handle assembly 70 to unlock the hinge/lock and locking assemblies 44,62 from their respective strikers 48,64 when the upper handle 80 is pulled or actuated via rods 82,84 (shown schematically in FIG. 2). The synchronizer 74 also selectively allows a handle 86 of the lower handle assembly 72 to unlock the hinge/lock and locking assemblies 50,62 from their respective strikers 54,64 when the lower handle 86 is pulled or actuated via the rod 84 and an actuator rod 88 (shown schematically in FIG. 2).

To prevent damage to the vehicle V and/or the tailgate 10, as well as potential injury to a user of the tailgate, the tailgate 10 is prevented from operating in both of its modes (swing-open and fold-down) simultaneously. If the tailgate 10 was able to open in both modes simultaneously, the tailgate would only be connected to the vehicle V by the hinge assembly 40, as all three lock assemblies 44,50,62 would be unlocked. For this purpose, the synchronizer 74 additionally communicates with the first and second hinge/lock assemblies 44,50 through sensor rods 90,92 (shown schematically in FIG. 2). Based on the communications received from the rods 90,92, the synchronizer 74 selectively enables communication between the handle assemblies 70,72 and each of the first hinge/lock assembly 44, the second hinge/lock assembly 50, and the locking assembly 62.

Specifically, the second hinge/lock assembly 50 is prevented from unlatching from its striker 54 whenever the first hinge/lock assembly 44 is already unlatched from its striker 48. Similarly, the first hinge/lock assembly 44 is prevented from unlatching from its striker 48 whenever the second hinge/lock assembly 50 is already unlatched from its striker 54. Moreover, the first and second hinge/lock assemblies 44,50 are prevented from both unlatching from their respective strikers 48,54 at the same time. Thus, one of the first and second hinge/lock assemblies 44,50 is always latched onto its striker 48 or 54 whenever the other of the first and second hinge/lock assemblies is unlatched from its striker.

Figure 5:
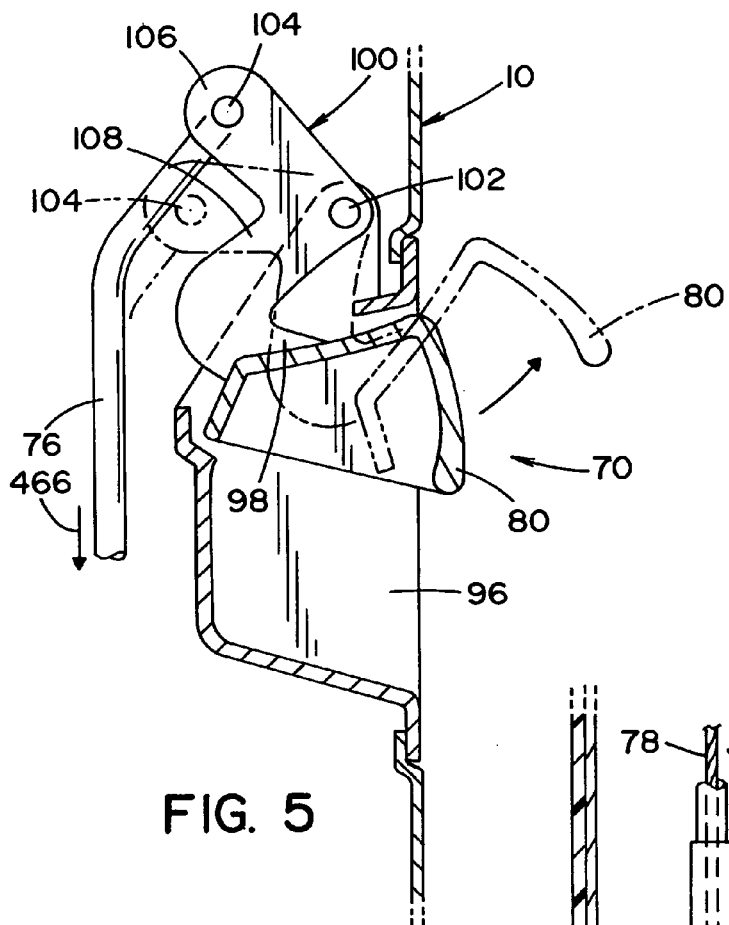
FIG. 5 is a cross-sectional view of an upper handle assembly taken along the line 5-5 of FIG. 2.

With reference to FIG. 5, the handle 80 of the upper handle assembly 70 mechanically communicates with the synchronizer 74 through the rod 76. Specifically, the handle 80 is mounted within a recess 96 provided in an exterior side of the tailgate 10. The handle 80 engages or is fixedly connected to a first arm 98 of an S-shaped lever 100 that is pivotally mounted to the tailgate 10 at hinge 102. A hinged connection 104 connects a second arm 106 of the lever 100 to the rod 76. A center portion 108 of the lever 100 connects the first arm 98 to the second arm 106. As shown, when the handle 80 is pulled, the lever 100 is pivotally moved which lowers arm 106 of the lever. Lowering of the arm 106 causes the rod 76 to move in the direction of arrow 466 and generally in the direction of the synchronizer 74. Thus, the stroke of the handle 80, when pulled, is communicated to the synchronizer 74 by the rod 76 moving or advancing toward the synchronizer.

Figure 6:
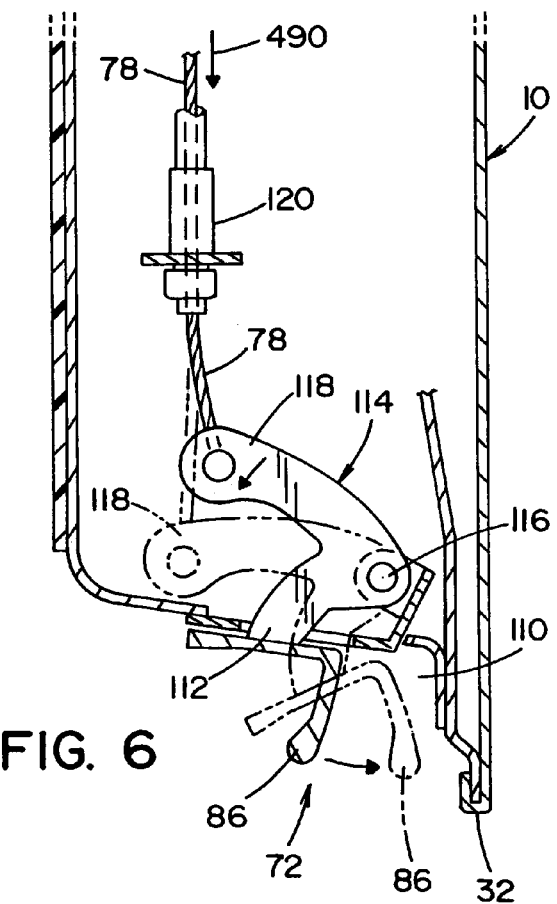
FIG. 6 is a cross-sectional view of a lower handle assembly taken along the line 6-6 of FIG. 2.
Figure 7:
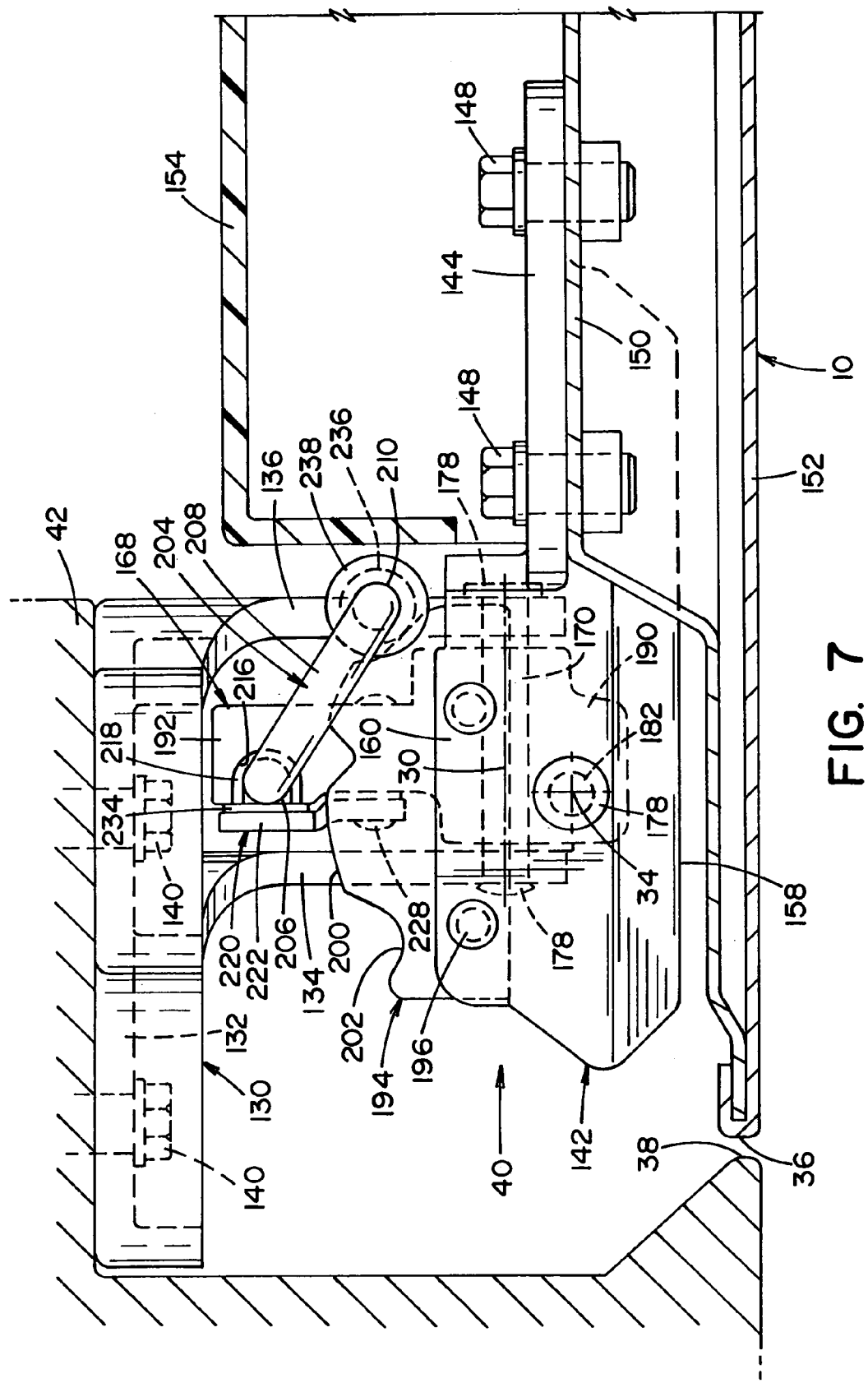
FIG. 7 is a cross-sectional plan view of a dual-mode hinge assembly taken along the line 7-7 of FIG. 2 showing the hinge assembly pivotally connecting the tailgate, shown in a closed position, to a body of the vehicle.
Figure 8:
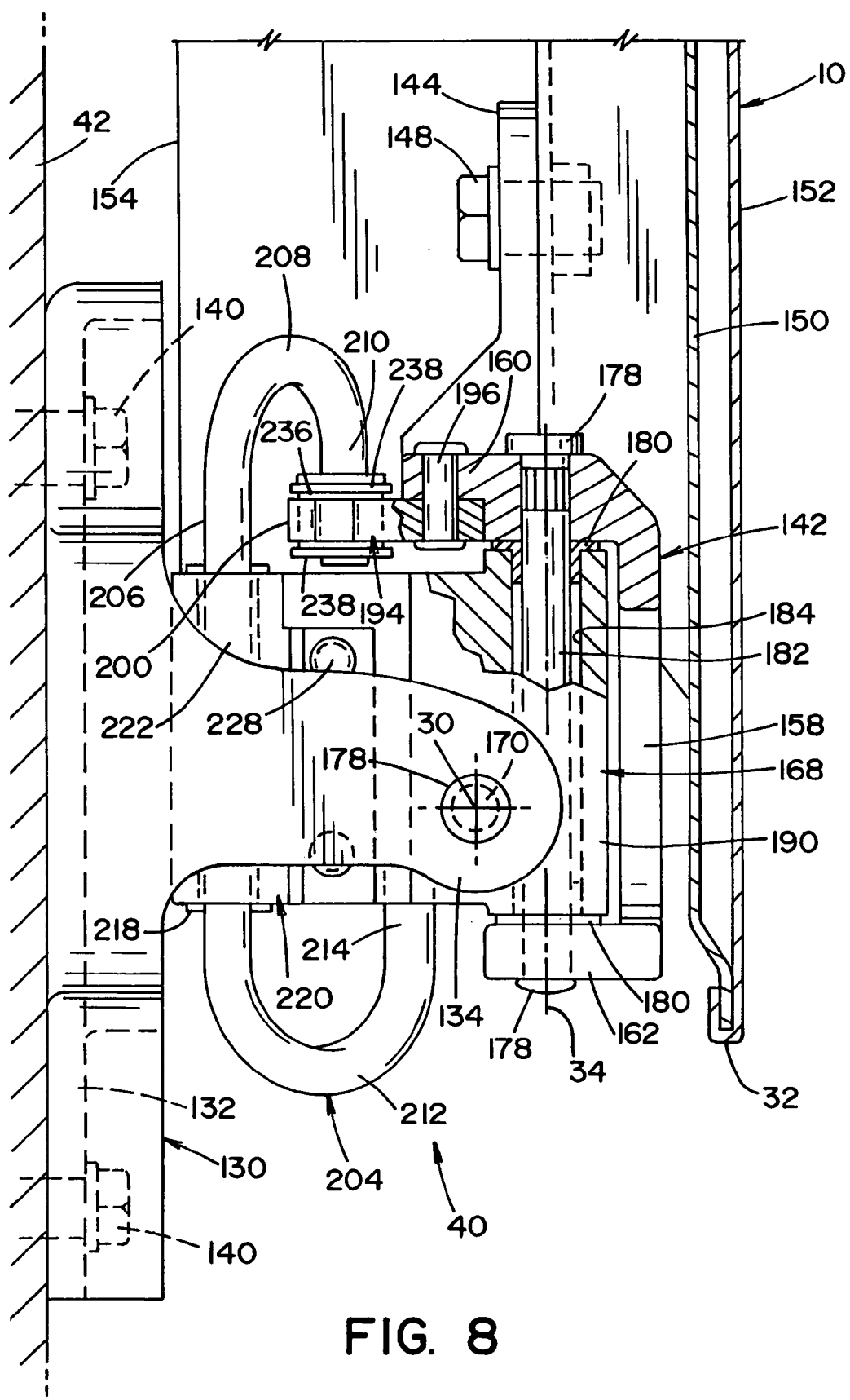
FIG. 8 is a partial cross-sectional side view of the dual-mode hinge assembly of FIG. 7 shown with the tailgate in the closed position.
Figure 9:
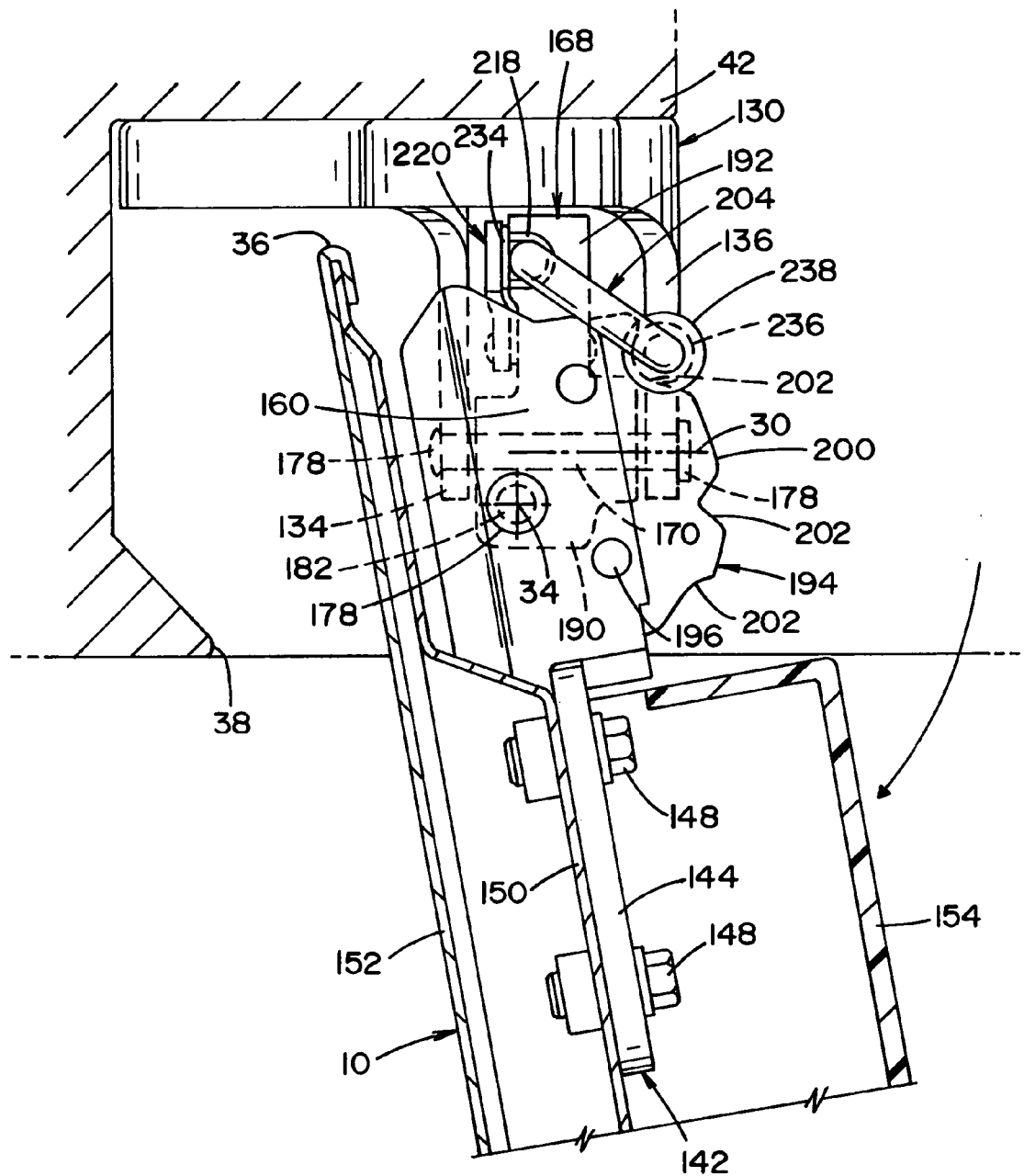
FIG. 9 is a cross-sectional plan view of the dual-mode hinge assembly of FIG. 7 shown with the tailgate in the swing-open position.
Figure 10:
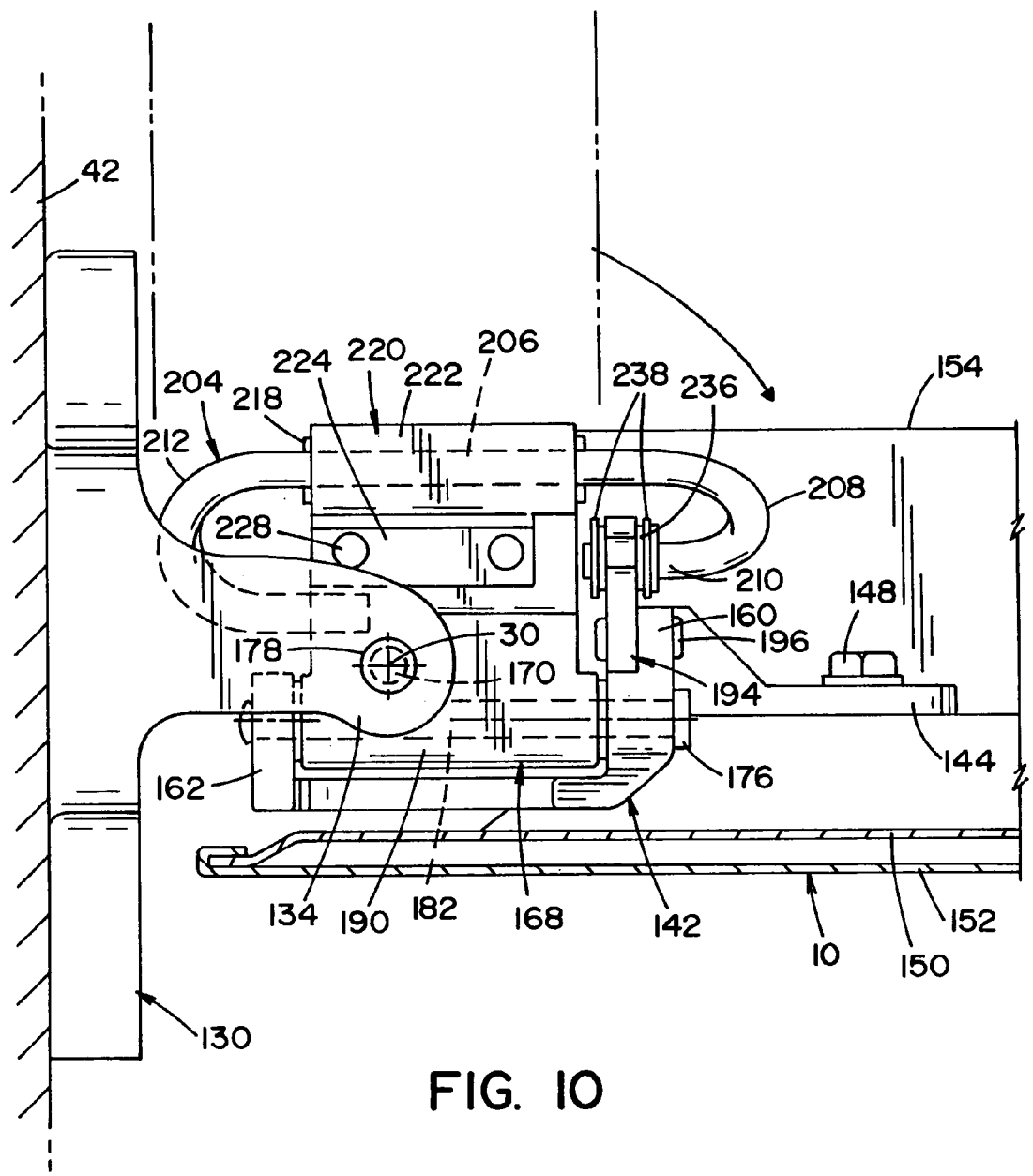
FIG. 10 is a cross-sectional side view of the dual-mode hinge assembly of FIG. 7 shown with the tailgate in the flip-down position.
Figure 11:
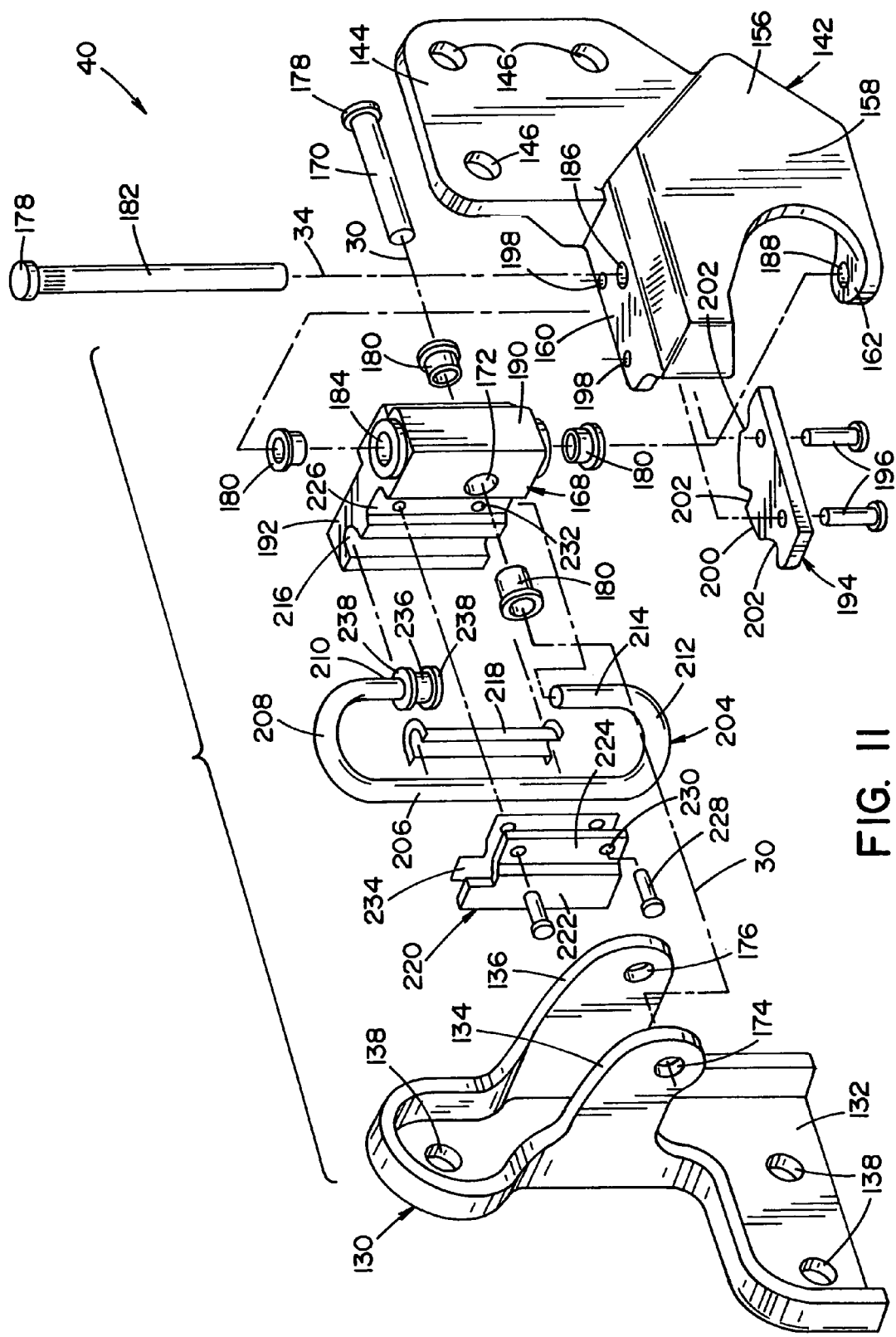
FIG. 11 is an exploded assembly view of the dual-mode hinge assembly of FIG. 7.

With reference to FIG. 6, the handle 86 of the lower handle assembly 72 mechanically communicates with the synchronizer 74 through the cable 78. Specifically, the handle 86 is mounted adjacent the bottom edge 32 of the tailgate 10. A recessed area 110 is formed along a portion of the bottom edge 32 and the handle 86 is mounted therein. The handle 86 engages or is fixedly connected to a first arm 112 of a lever 114 that is pivotally mounted to the tailgate 10 at hinge 116. An end of the cable 78 is attached to a second arm 118 of the lever 114. A cable mount 120 that allows the cable 78 to slidably move therethrough can be provided for guiding the cable 78 adjacent the handle assembly 72. Rotation of the second arm 118 causes the cable 78 to be pulled. Thus, the stroke of the handle 86, when pulled, is communicated to the synchronizer 74 by the cable 78 pulling in the direction of arrow 490 from the synchronizer 74.

With reference to FIGS. 7-11, in accordance with the illustrated embodiment, the dual-mode hinge assembly 40 includes a body bracket 130 that fixedly mounts to the pillar 42. The bracket 130 includes a base portion 132 and a pair of spaced apart legs 134,136 extending from the base portion. The legs 134,136 are generally the same or similar and extend from the base portion 132 in a direction approximately normal relative thereto. The bracket 132 further includes a plurality of mounting holes 138 defined in the base portion 132 that receive mounting bolts 140 for securing the bracket 130 to the pillar 42 of the vehicle V.

The hinge assembly 40 further includes a tailgate bracket 142 that fixedly mounts to the tailgate 10 adjacent a first corner thereof. The bracket 142 includes a mounting portion 144 defining a plurality of mounting holes 146 that receive bolts 148 for securing the bracket 142 to the tailgate 10. Specifically, the mounting portion 144 is connected to a frame portion 150 of the tailgate. In one embodiment, the tailgate 10 includes the frame portion 150 formed of stamped sheet metal to which a skin 152 and cladding 154 are attached. The skin 152 can be made to generally match an exterior of the vehicle V and the inner cladding 154 can be stiffened to accept loading thereon when the tailgate 10 is in the flip-down position. For example, the tailgate structure can be the same or similar to the tailgate described in commonly owned, pending U.S. patent application Ser. No. 10/663,138, entitled "Improved Frame Structure for Vehicle Tailgate" and filed on Sep. 16, 2003, expressly incorporated herein by reference. The bracket 142 additionally includes a hinge portion 156 having a base 158 generally parallel to the mounting portion 144 and legs 160,162 extending from the base 158 in a direction approximately normal relative thereto.

The hinge assembly 40 further includes a rotatable member 168 pivotally connected to the body bracket 130 for rotation about the first axis 30 and pivotally connected to the tailgate bracket 142 for rotation of the tailgate bracket 142 and tailgate 10 about the second axis 34. More specifically, a first pivot pin or pintle 170 rotatably connects the rotatable member 168 to the body bracket 130. The rotatable member 168 defines a first throughhole 172 that is aligned with throughholes 174,176 defined, respectively, in legs 134,136. The pin 170 is received through the aligned throughholes 172,174,176 to rotatable connect the rotatable member 168 to the bracket 130 along the first axis 30.

The pin 170 includes heads 178 at both ends thereof for securing the pin between the legs 134,136. One of the heads is formed in the pin prior to assembly and the other is formed by riveting during assembly. Optionally, bearings 180 can be employed radially between the pin 170 and the rotatable member 168. The horizontal pin 170 allows the rotatable member 168, the tailgate bracket 142 and the tailgate 10 connected thereto to rotate relative to the body bracket 130 and the vehicle V which remain stationary during pivoting of the tailgate 10 about the first axis 30.

A vertical pivot pin or pintle 182 rotatably connects the rotatable member 168 to the tailgate bracket 142. The vertical pin 182 is received in a second throughhole 184 defined in the rotatable member and a pair of aligned throughholes 186,188 defined, respectively, in the legs 160, 162. Like the horizontal pin 178, the vertical pin 182 includes heads 178 at both ends thereof to secure the pin 182 between the legs 160,162. Again, optionally, bearings 180 can be employed radially between the pin 182 and the rotatable member 168. The pin 182 allows the tailgate bracket 142 and the tailgate 10 connected thereto to rotate relative to the rotatable member 168, the body bracket 130 and the vehicle V during pivoting of the tailgate about the second axis 34.

The rotatable connections between the rotatable member 168 and the brackets 130,142 are described according to one embodiment of the invention. These types of rotatable connections employed in hinges are generally longer lasting, easier to manufacture and easier to install than other types of rotatable connections. However, it is contemplated that other rotatable connections, such as, for example, ball bearing-type rotatable connections, could be used and are to be considered within the scope of the present invention.

The rotatable member 168 includes a body portion 190 and an arm portion 192 extending from the body portion 190. The throughhole 184 extends through the body portion 190 along a longitudinal extent thereof. The throughhole 172 extends through the body portion 190 in an orientation generally normal to an axis defined along the throughhole 184 and offset from throughhole 184 such that the throughholes 172,184 do not intersect. The arm portion 192 extends in a direction generally perpendicular to axes defined along both throughholes 172,184 and attaches to the body portion 190 along a longitudinal extent of the body portion 190 and generally adjacent the throughhole 172.

A cam profile plate 194 is mounted to the upper leg 160 by rivets 196 received in throughholes 198 defined in the upper leg. The plate 194 includes a cam surface or edge 200 having indexed or checker locations 202 defined therein. For engagement with the cam surface 200, as will be described in more detail below, a biasing member 204 is fixedly secured to the rotatable member 168. More particularly, the biasing member 204 is a C-shaped torsion spring having an elongated portion 206, a first curved portion 208 with a short portion 210 extending therefrom in an orientation parallel to the elongated portion 206 and a second curved portion 212 with another short portion 214 extending therefrom in an orientation parallel to the elongated portion 206.

The elongated portion 206 is received within a circular groove 216 defined in one side of the rotatable member arm portion 192. Optionally, a semicircular bearing or sleeve 218 can be received in the groove 216 for directly engaging the torsion spring 204. A securing plate 220 is mounted to the rotatable member arm portion 192 to secure the torsion spring 204 in the groove 216. In the illustrated embodiment, the securing plate 220 includes a first portion 222 that mounts against or adjacent the torsion spring 204 and a mounting portion 224 that is received in a corresponding or mating groove 226 defined in the arm portion 192 adjacent the groove 216. Additionally, rivets 228 are received in throughholes 230,232 defined in the plate 220 and the rotatable member arm portion 192. Optionally, a gasket 234 can be received between the securing plate 220 and the rotatable member 168 with the spring 204 received in the groove 216 thereof.

The short portion 210 of the spring 204 is positioned to be engaged by the cam surface 200 of the plate 194 when the tailgate 10 is opened to and/or closed from the swing-open position, i.e., about the first pivot axis 30. More specifically, the short portion 210 includes a cam follower 236 rotatable attached thereto having a generally round cross-section. The follower 236 is positioned on the short portion 210 so that it is engaged by cam surface 200 as the tailgate opens toward or from the swing-open position. In the illustrated embodiment, the cam surface 200 is generally parallel with the first vertical axis 30.

The follower 236 includes radial flanges 238 for maintaining alignment of the cam surface 200 with the follower 236. The engagement between the follower 236 and the cam surface 200 having checker locations 202 provides an integrated checker function to the hinge assembly 40 when used for pivotally opening the tailgate 10 about the first axis 30. As should be appreciated by those skilled in the art, the cam surface 200 can be shaped such that engagement with the follower 236 of the torsion spring 204 (1) urges the tailgate 10 into specific predetermined or preselected positions or checkpoints when the tailgate 10 is opened/closed about the first pivot axis 30, (2) maintains the tailgate 10 in one of said specific predetermined positions until a predetermined force is applied to the tailgate 10 to overcome the urging of the torsion spring 204 and/or (3) limits rapid or fast opening and closing of the tailgate 10 about the first pivot axis 30. It should additionally be appreciated that other specific checker arrangements other than the illustrated embodiment can be utilized and all such arrangements are to be considered within the scope of the present invention.

The dual mode hinge assembly 40 described herein can be assembled with components that are relatively easy and inexpensive to manufacture and assemble. For example, the components of the hinge assembly 40 can include primarily stamped and/or welded components. Further, the use of bolts 140,148 for, respectively, connecting the body bracket 130 to the vehicle V and for connecting the tailgate bracket 142 to the tailgate 10 enables relatively easy assembly of the tailgate to an associated vehicle. This, in contrast to all or most prior art tailgates, allows the tailgate to be assembled separately from the vehicle and attached to the vehicle after both the tailgate and the vehicle have already been subassembled.

Figure 12:
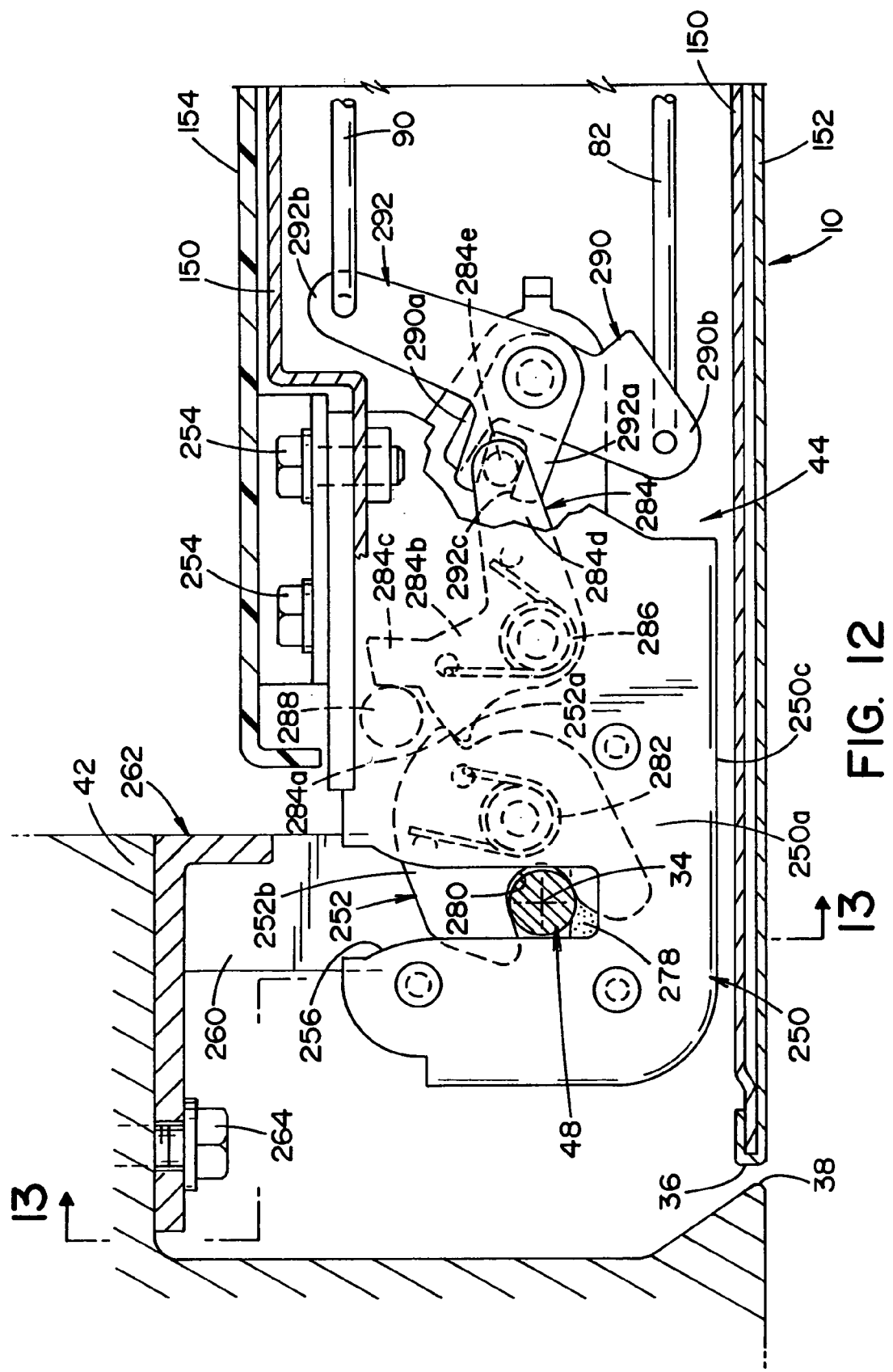
FIG. 12 is a cross-sectional plan view of a first hinge/lock assembly taken along the line 12-12 of FIG. 2 showing the first hinge/lock assembly releasably and hingedly connecting the tailgate, shown in a closed position, to the vehicle body.
Figure 13:
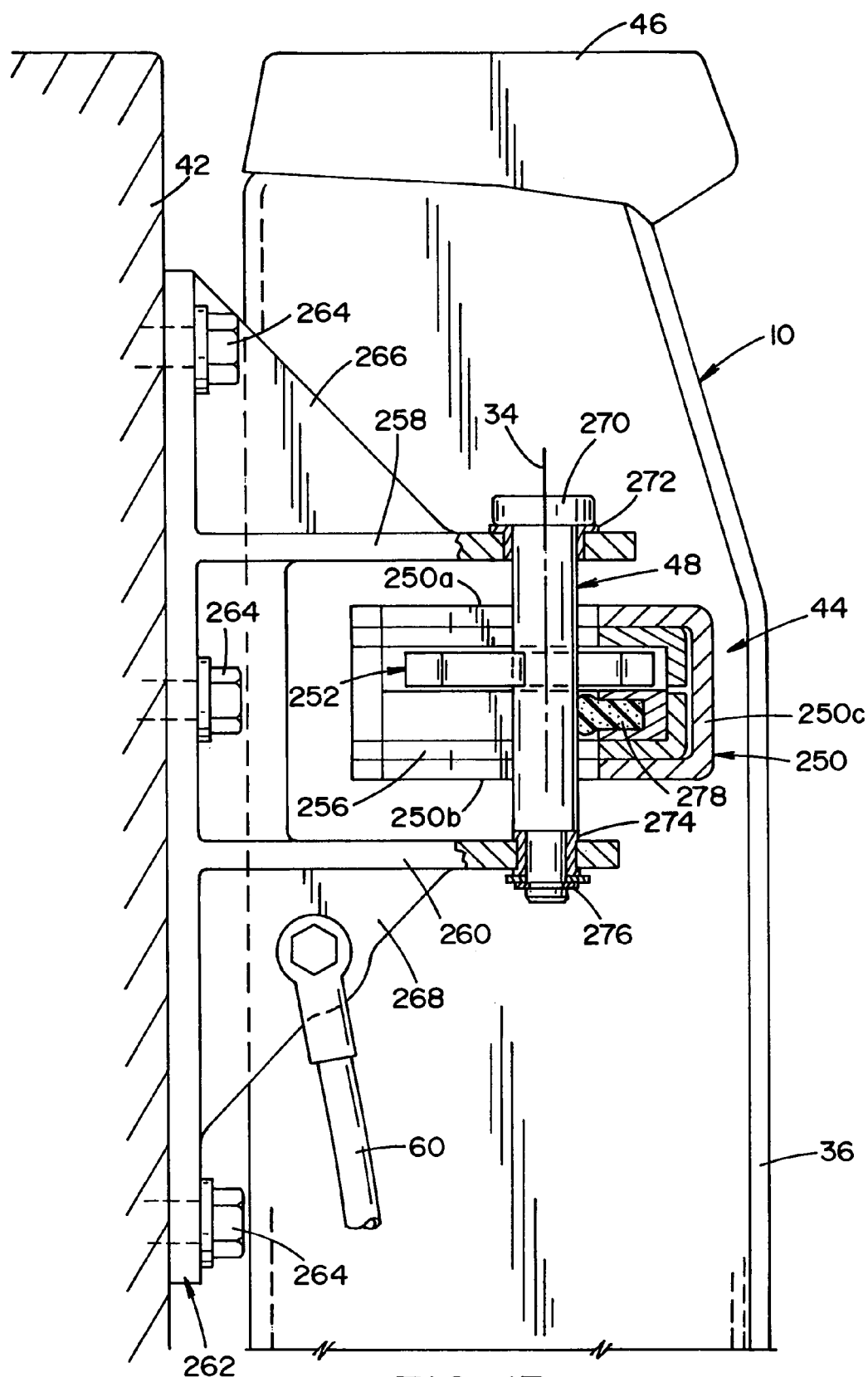
FIG. 13 is a cross-sectional side view of the first hinge/lock assembly taken along the line 13-13 of FIG. 12.

With reference to FIGS. 12 and 13, the first hinge/lock assembly 44 includes a latching assembly having a lock body 250 and a latch 252. The lock body 250 is secured to the tailgate 10 and, more specifically, the tailgate frame 150 via conventional fasteners, such as rivets or bolts 254, so that a lock body recess 256 defined in the lock body is aligned with and able to receive the striker 48 when the tailgate 10 is in the closed position. The lock body 250 generally includes a first wall 250a, a second wall 250b spaced from the first wall and at least one connecting wall 250c extending between the first and second walls. The recess 256 is provided through the at least one connecting wall 250c and into portions of the walls 250a,250b.

In the illustrated embodiment, the striker 48 is rotatably mounted between spaced apart arms 258,260 of a striker mounting bracket 262. The bracket 262 is mounted to the pillar 42 of the vehicle V via conventional fasteners, such as rivets or bolts 264. The bracket 262 includes support portions 266,268 for strengthening the arms 258,260. In the illustrated embodiment, the support cable 60 is connected to the lower support portion 268. In one embodiment, the striker 48 includes a head 270 limiting axial movement of the striker relative to the arms 258,260. Bearings 272,274 are provided radially between the striker 48 and portions of the arms 258,260 into which throughholes are defined for receiving the striker. A retaining ring 276 is used to further limit axial movement of the striker 48 on an end thereof opposite the head 270.

When the tailgate 10 is in the closed position, the striker 48 is received in the recess 256. A bumper 278 of a resilient material, such as rubber, can be provided within the recess 256 for cushioning or dampening engagement between the striker 48 and the lock body 250, particularly when the striker 48 is first received into the recess 256 after the tailgate 10 is moved to the closed position from the flip-down position. The latch 252 is rotatably mounted to the lock body 250 for selectively latching onto the striker 48 to lock the striker to the lock body 250 and in the lock body recess 256 thereby locking the first hinge/lock assembly 44 to the striker 48 and the pillar 42 of the vehicle V. The latch 252 includes a latch recess 280 for receiving the striker 48 and is moveable between a latched position and an unlatched position. More particularly, as will be described in more detail below, when the tailgate 10 is moved to the closed position from the flip-down position and the striker 48 is received in the recesses 256,280, the striker 48 causes the latch 252 to move and, specifically, rotate about the striker 48 to the latched position (shown in FIG. 12) wherein the latch locks the striker 48 in the lock body recess 256 of the lock body 250. When the latch 252 is in the unlatched position (shown in FIG. 14C), the striker 48 is freely moveable into and from (i.e., removable) the recesses 256, 280.

The hinge/lock assembly 44 additionally includes a latch biasing means, such as torsion spring 282, rotatably urging the latch 252 in a first rotatable direction (clockwise in FIG. 12) toward the unlatched position. A ratchet 284 is rotatably mounted to the lock body 250 adjacent the latch 252 for selectively engaging or locking the latch 252 and holding the latch in the latched position. More particularly, the latch 252 includes a catch surface 252a that is selectively engaged by an opposing catch surface 284a defined on a first leg 284b of the ratchet. A ratchet biasing means, such as torsion spring 286, rotatably urges the ratchet 284 in a second rotatable direction (counterclockwise in FIG. 12) toward an engaged or engaging position, wherein the opposing catch surface 284a is urged into engagement with the latch 252.

The ratchet 284 is moveable between the engaged position wherein the ratchet locks the latch in the latched position and a disengaged position wherein the latch is moveable between the latched position and the unlatched position. As will be described in more detail below, a locked or unlocked status or condition of the striker 48 in the lock body recess 256 is determinable by the position (engaged or disengaged) of the ratchet. The ratchet 284 includes an extending portion 284c that engages a stop 288 to limit movement of the ratchet in the second rotatable direction. The stop 288 also limits movement of the latch 252 in the first rotatable direction when the ratchet 284 is in the disengaged position that allows movement of the latch between the latched position and the unlatched position.

A second leg 284d of the ratchet includes a pin 284e extending therefrom and positioned for engagement with a pair of rotatably mounted levers, including actuator lever 290 and sensor lever 292. The actuator lever 290 is rotatably mounted to the lock body 250 and has a first leg 290a positioned adjacent the pin 284e for engagement therewith and a second leg 290b pivotally connected to the actuator rod 82 thereby rotatably connecting the actuator rod 82 to the lock body 250. Similarly, the sensor lever 292 is rotatably mounted to the lock body 250 and has a first leg 292a positioned adjacent the pin 284e for engagement therewith and a second leg 292b pivotally connected to the sensor rod 90 thereby rotatably connecting the sensor rod 90 to the lock body 250. In the illustrated embodiment, the first leg 292a defines a slot 292c that receives the pin 284e so that the sensor lever 292 is adapted for corresponding movement with the ratchet 284. Alternatively, the first leg 292a could be configured without a slot and positioned on an opposite side of the pin 284e than the leg 290a. In such an alternative arrangement, a biasing means, such as torsion spring, could be provided to rotatably urge the sensor lever 292 in the first rotatable direction to maintain engagement between the leg 292a and the pin 284e which would ensure that the position of the lever 292 corresponds with the position of the ratchet 284.

Figure 14A:
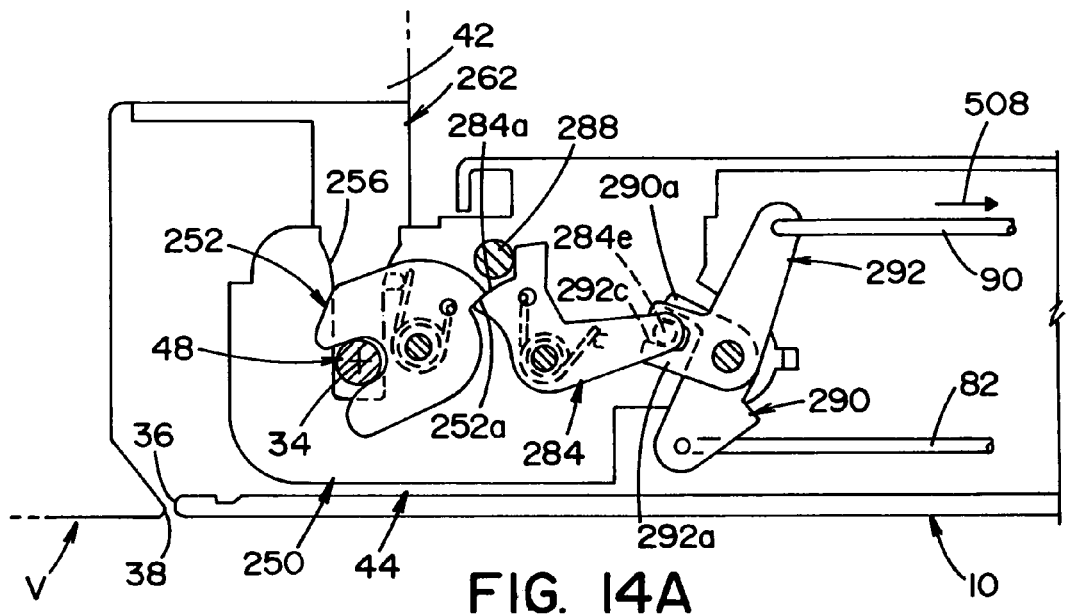
FIG. 14A is a schematic view of the first hinge/lock assembly of FIG. 12 shown in a latched position with the tailgate in the closed position.

With reference to FIG. 14A, the tailgate 10 is shown in the closed position and the first hinge/lock assembly 44 is shown in a latched or locked position. In these positions, the striker 48 is received in the lock body recess 256 and the latch 252 is in the latched position thereby locking the striker within the recess 256 and releasably connecting the striker 48 to the lock body 250, which also releasably connects the vehicle body to which the striker 48 is mounted to the tailgate 10 to which the lock body 250 is mounted. Though the latch 252 is urged toward the unlatched position, the latch is held in the latched position by the ratchet 284 which is in the engaged position. The ratchet 284 is in the engaged position when locking the latch 252 in the latched position to lock the striker 48 in the lock body recess 256. Particularly, the opposing catch surface 284a of the ratchet engages the catch surface 252a of the latch to maintain the latch in the latched position when the ratchet is in the engaged position.

Figure 14B:
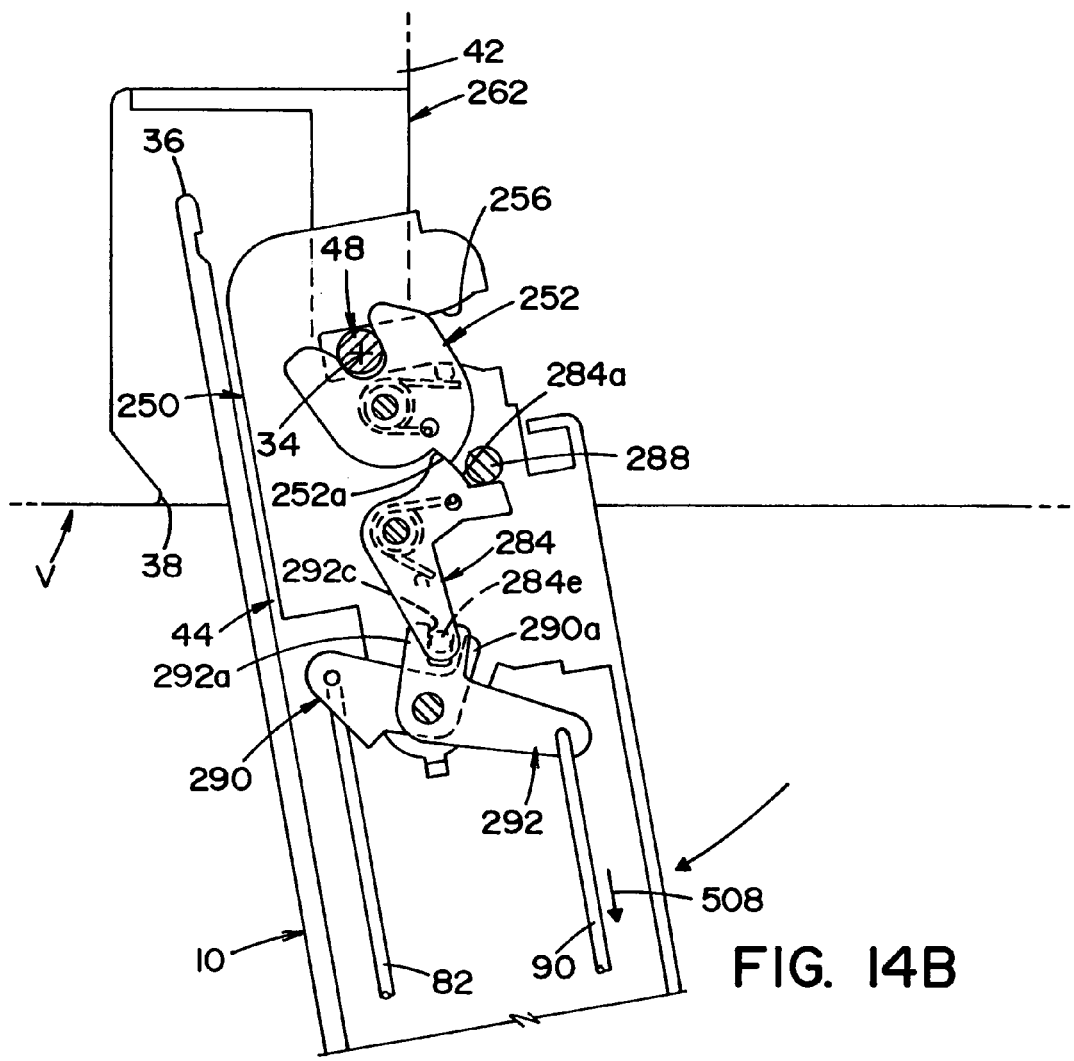
FIG. 14B is a schematic view of the first hinge/lock assembly of FIG. 12 shown in the latched position with the tailgate in a swing-open position.

With the ratchet 284 in the engaged position, the pin 284e causes the sensor lever 292 to rotate in the first direction toward a sensor lever first position that corresponds with the latched position of the latch 252 and the engaged position of the ratchet 284. In the sensor lever first position, the sensor rod 90 is moved toward or in the direction of the synchronizer 74, as shown by arrow 508, to a sensor rod first position corresponding to the ratchet engaged position. With additional reference to FIG. 14B, when the striker 48 is locked to the lock body 250, the tailgate 10 is movable toward or to the swing-open position. While opening toward the swing-open position, the lock body 250 pivots about the striker 48 and the latch 252 remains in the latched position to retain the striker 48 within the lock body recess 256. Likewise, the ratchet 284 remains in the engaged position and the sensor lever 292 remains in the sensor lever first position wherein the sensor rod 90 mechanically communicates with the synchronizer 74 by the rod 90 being in a forward position in the direction of arrow 508.

Figure 14C:
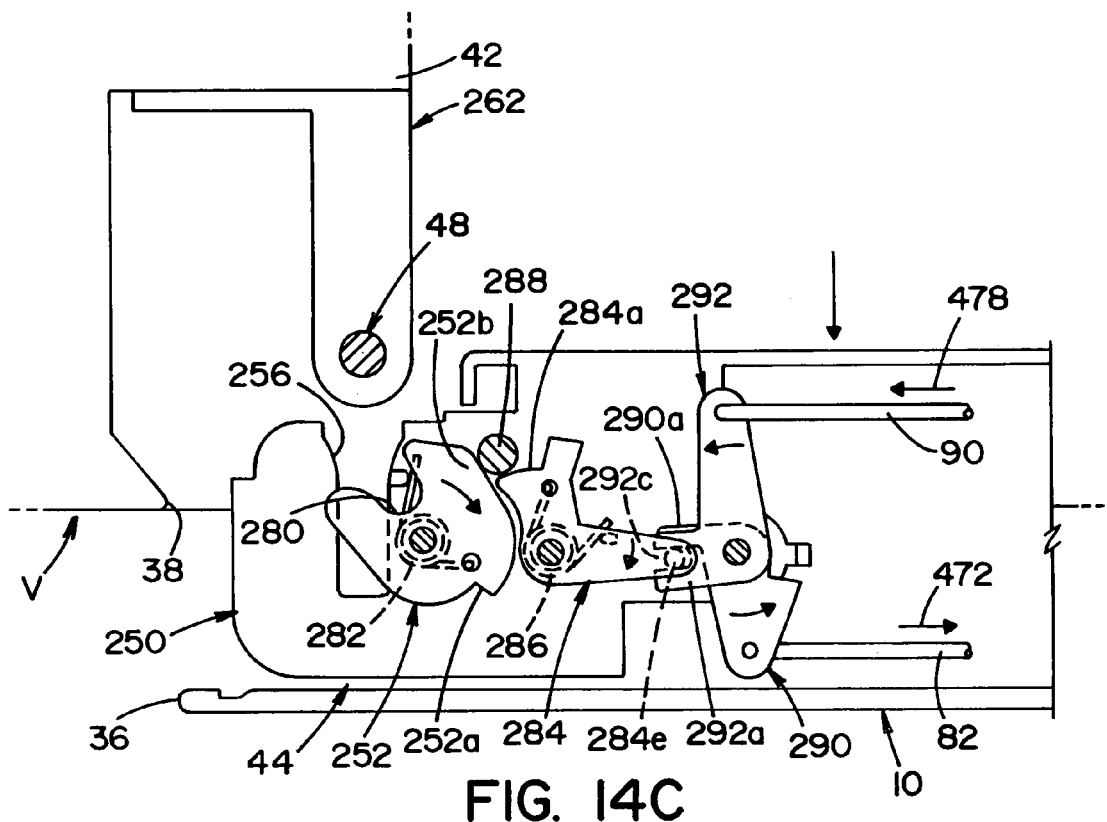
FIG. 14C is a schematic view of the first hinge/lock assembly of FIG. 12 shown in an unlatched position with the tailgate moving toward the flip-down position.

To unlock the first hinge/lock assembly 44 from the striker 48, with additional reference to FIG. 14C, the synchronizer 74 pulls the actuator rod 82 in a first direction, indicated by arrow 472, which rotates the actuator lever 290 in the second rotatable direction. The leg 290a engages and moves the pin 284e to rotate the ratchet 284 in the first rotatable direction. Movement of the pin 284e causes the pin to engage the leg 292a of the sensor lever 292 thereby moving the sensor lever 292 in the second rotatable direction to a sensor lever second position corresponding to the ratchet disengaged position wherein the sensor-rod 90 mechanically communicates with the synchronizer 74 by the rod 90 being in a retracted position, indicated by arrow 478.

The ratchet 284 is moved in the first rotatable position against the urging of the spring 286 to the disengaged position wherein the opposing catch surface 284a is removed as an obstruction to the latch 252. With the ratchet 284 in the disengaged position, the spring 282 moves the latch 252 to the unlatched position which unlocks the first hinge/lock assembly 44 and allows removal of the striker 48 from the lock body recess 256. More particularly, as the latch 252 moves toward the unlatched position, the latch 252 forcibly moves the striker 48 from the lock body recess 256 which causes the tailgate 10 to at least partially move toward the flip-down position (as shown in FIG. 14C). The stop 288 limits movement of the latch 252 in the first rotatable direction by engaging a first leg 252b of the latch. Thus, the stop 288 holds the latch 252 in the unlatched position.

Figure 14D:
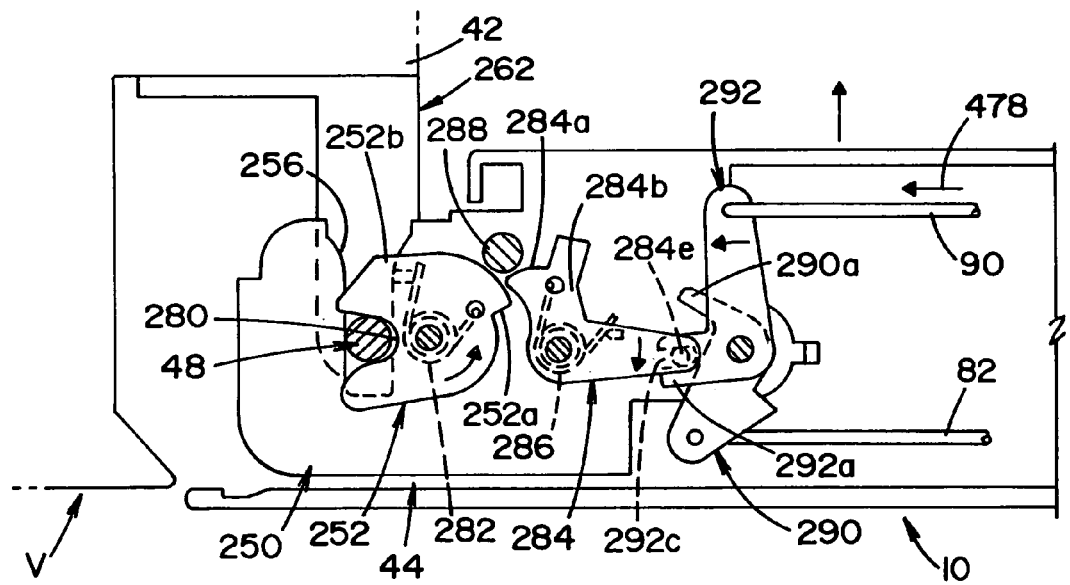
FIG. 14D is a schematic view of the first hinge/lock assembly of FIG. 12 shown in a partially latched position with the tailgate moving toward the closed position from the flip-down position.

As long as the ratchet 284 remains in the disengaged position, the sensor lever 292 remains in the sensor lever second position and the rod 90 remains in the retracted position. Thus, when the ratchet 284 is in the disengaged position, the sensor rod 90 continues to mechanically communicate to the synchronizer 74 that the hinge/lock assembly 44 is unlocked by remaining in the retracted position. Until the latch 252 is re-latched onto the striker 48, the ratchet 284, due to its profile or shape, remains in the disengaged position. Thus, the ratchet 284 remains in the disengaged position when the latch is in the unlatched position and/or the latch is moveable between the latched position and the unlatched position. The ratchet 284 is only in the engaged position when the latch is in the latched position. More particularly, with additional reference to FIG. 14D, when the striker 48 is initially received or moved in the lock body recess 256 and the latch recess 280 causing the striker to partially rotate the latch in the second rotatable direction against the urging of the spring 282 toward the latched position, the ratchet 284 remains in the disengaged position.

The spring 286 urges the ratchet 284 and, more particularly, the leg 284b into the latch 252, but, until the latch is rotated to the latched position (shown in FIG. 14A), the opposing catch surface 284a of the ratchet does not engage the catch surface 252a of the latch. When the catch surface 252a finally passes the opposing catch surface 284a (i.e., the latch 252 is in the latched position), the ratchet 284 moves into the engaged position to hold the latch in the latched position. When the ratchet 284 is in the engaged position, the pin 284e rotates the sensor lever 292 back to the first sensor lever position wherein the sensor rod 90 is moved back to the forward position mechanically communicating the locked status of the first hinge/lock assembly 44.

Thus, the hinge/lock assembly 44 and, particularly, the shape of the ratchet 284 employed in the hinge/lock assembly 44, enable the ratchet 284 to be used for communicating the status of the hinge/lock assembly 44, locked or unlocked. The shape of the ratchet 284 and the configuration of the lock body 250 allow the ratchet's position to directly correspond to the status of the hinge/lock assembly 44. When the striker 48 is locked to the lock body 250 by the latch 252, the ratchet is in the engaged position. When the striker 48 is unlocked from the lock body 250, the ratchet is in the disengaged position and remains there until the lock body 250 is re-locked to the striker 48. The lever 292 and rod 90 communicate the position of the ratchet, and thereby the status of the hinge/lock assembly 44, to the synchronizer 74.

With reference to FIGS. 15-18, the second hinge/lock assembly 50 includes a latching assembly having a lock body 302 and a latch 304. The lock body 302 is secured to the tailgate 10 and, more specifically, the tailgate frame 150 via conventional fasteners, such as rivets or bolts 306, so that a lock body recess 308 defined in the lock body is aligned with and able to receive the striker 54 when the tailgate 10 is in the closed position (shown in FIG. 15). The lock body 302 generally includes a first wall 302a, a second wall 302b spaced from the first wall and at least one connecting wall 302c extending between the first and second walls. The recess 308 is provided through the at least one connecting wall 302c and into portions of the walls 302a,302b.

In the illustrated embodiment, the striker 54 is rotatably mounted between spaced apart arms 310,312 of a striker mounting bracket 314. The bracket 314 is mounted to the pillar 56 of the vehicle V via conventional fasteners, such as bolts 316. In most respects, according to the illustrated embodiment, the striker 54 is like the striker 48. For example, the striker 54 includes a head 318, bearings 320,322 provided annularly about the striker 54, and a retaining ring 324. When the tailgate 10 is in the closed position, the striker 54 is received in the recess 308. A bumper 326, like bumper 278, can be provided within the recess 308.

The latch 304 is rotatably mounted to the lock body 302 for selectively latching onto the striker 54 to lock the striker to the lock body 302 and in the lock body recess 308 thereby locking the second hinge/lock assembly 50 to the striker 54 and the pillar 56 of the vehicle V. The latch 304 includes a latch recess 328 for receiving the striker 54 and is moveable between a latched position and an unlatched position. More particularly, as will be described in more detail below, when the tailgate is moved to the closed position from the swing-open position (shown between swing-open position and closed position in FIG. 18) and the striker 54 is received in the recesses 308,328, the striker 54 causes the latch 304 to move and, specifically, rotate about the striker 54 to the latched position (shown in FIG. 15) wherein the latch locks the striker 54 in the lock body recess 308 of the lock body 302. When the latch 304 is in the unlatched position (shown in FIG. 19A), the striker 54 is freely moveable (i.e., removable) into and from the recesses 308,328.

The second hinge/lock assembly 50 additionally includes a latch biasing means, such as torsion spring 330, rotatably urging the latch 304 in the second rotatable direction (counterclockwise in FIG. 15) toward the unlatched position. A ratchet 332 is rotatably mounted to the lock body 302 adjacent the latch 304 for selectively engaging or locking the latch 304 and holding the latch in the latched position. More particularly, the latch 304 includes a catch surface 304a that is selectively engaged by an opposing catch surface 332a defined on a first leg 332b of the ratchet. A ratchet biasing means, such as torsion spring 334, rotatably urges the ratchet 332 in the first rotatable direction (clockwise in FIG. 15) toward an engaged or engaging position, wherein the opposing catch surface 332a is urged into engagement with the latch 304. The ratchet 332 is moveable between the engaged position wherein the ratchet locks the latch 304 in the latched position and a disengaged position wherein the latch is moveable between the latched position and the unlatched position. As will be described in more detail below, a locked or unlocked status of the striker 48 in the lock body recess 256 is determinable by the position (engaged or disengaged) of the ratchet. The ratchet 332, which is substantially similar in shape to the ratchet 284 of the first hinge/lock assembly, includes an extending portion 332c that engages a stop 336 to limit movement of the ratchet in the first rotatable direction. The stop 336 also limits movement of the latch 304 in the second rotatable direction when the ratchet 332 is in the disengaged position that allows movement of the latch between the latched position and the unlatched position.

A second leg 332d of the ratchet includes a pin 332e extending therefrom and positioned for engagement with a rotatably mounted connecting lever 338. More particularly, the pin 332e is received in a recess 338a defined in a first leg 338b of the connecting lever. The lever 338 includes a second leg 338c positioned for engagement with a pair of levers, including actuator lever 342 and sensor lever 344, which are rotatably mounted and oriented approximately normal relative to the connecting lever 338. More particularly, the connecting lever 338 rotates about an axis approximately parallel relative to the first axis and the levers 342,344 are positioned to be approximately parallel with the opening or a plane in which the tailgate 10 is disposed. The lever 338 also includes a hook portion 338d positioned on an opposite side of the sensor lever 344 than the second leg 338c. The hook portion 338d and the second leg 338c together form a C-shaped portion of the lever 338 that defines a recess 338e in which the sensor lever 344 is disposed. The capture of the lever 344 within the C-shaped portion 338c,338d causes the sensor lever 344 to move with the lever 338.

Figure 27:
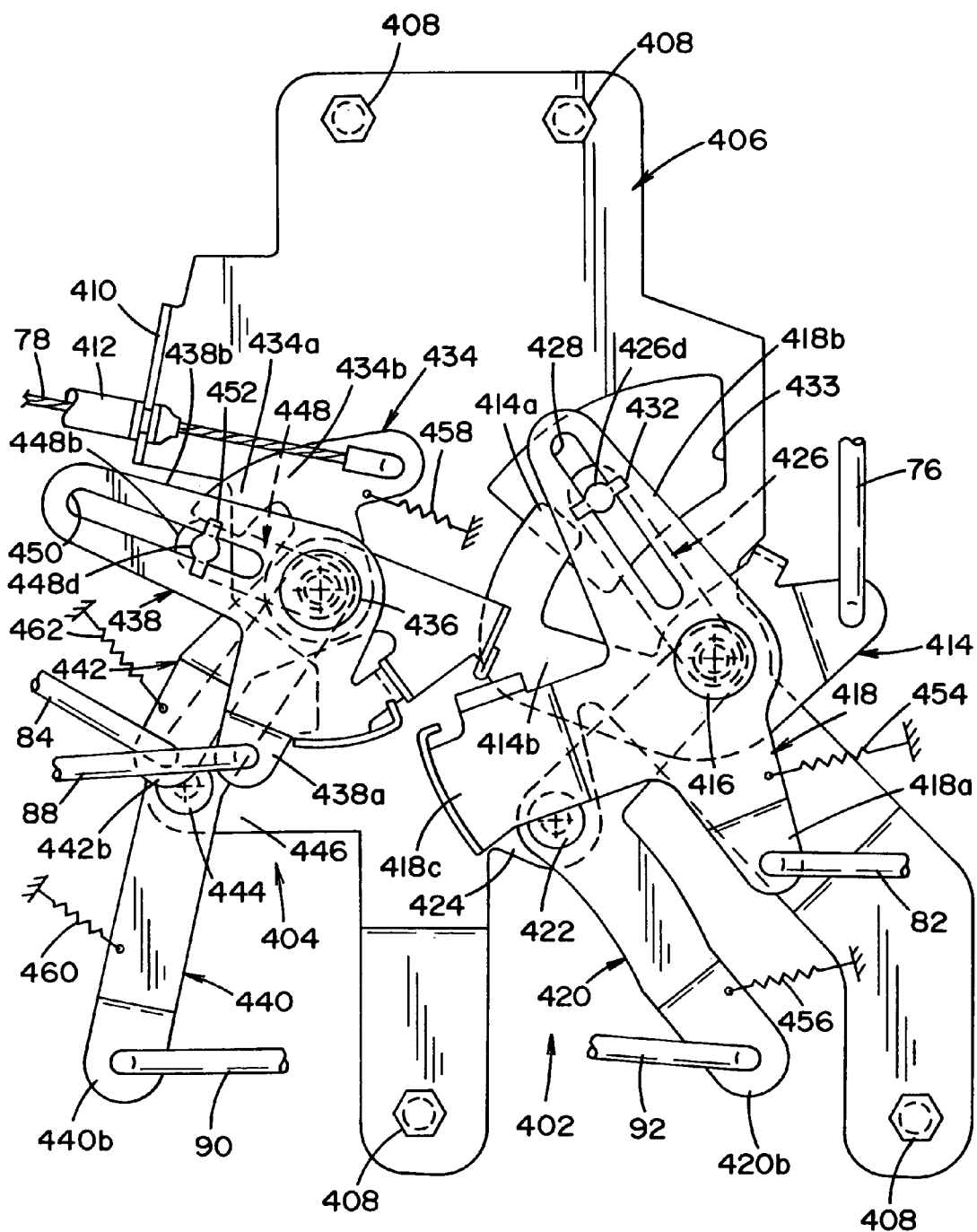
FIG. 27 is a front elevational view of the synchronizer of FIG. 24 shown with the tailgate in the closed position.

The actuator lever 342 includes a first leg 342a positioned adjacent the second leg 338c for engagement with lever 338. The lever 342 additionally includes a second leg 342b pivotally connected to the actuator rod 88. The sensor lever 344 includes a first leg 344a positioned adjacent the second leg 338c for engagement therewith and within the recess 338e and a second leg 344b pivotally connected to the sensor rod 92. As shown, in the illustrated embodiment, the connector lever second leg 338c is disposed between the legs 342a,344a. Optionally, fold-over portions 346 are provided on the legs 342a,344a of the levers for cushioning the engagement between the leg 338c and the levers 342,344. The sensor lever 344 is rotatably urged in the first rotatable direction into engagement with the connecting lever 338 by spring 456 (FIG. 27) acting through the sensor rod 92.

Figure 15:
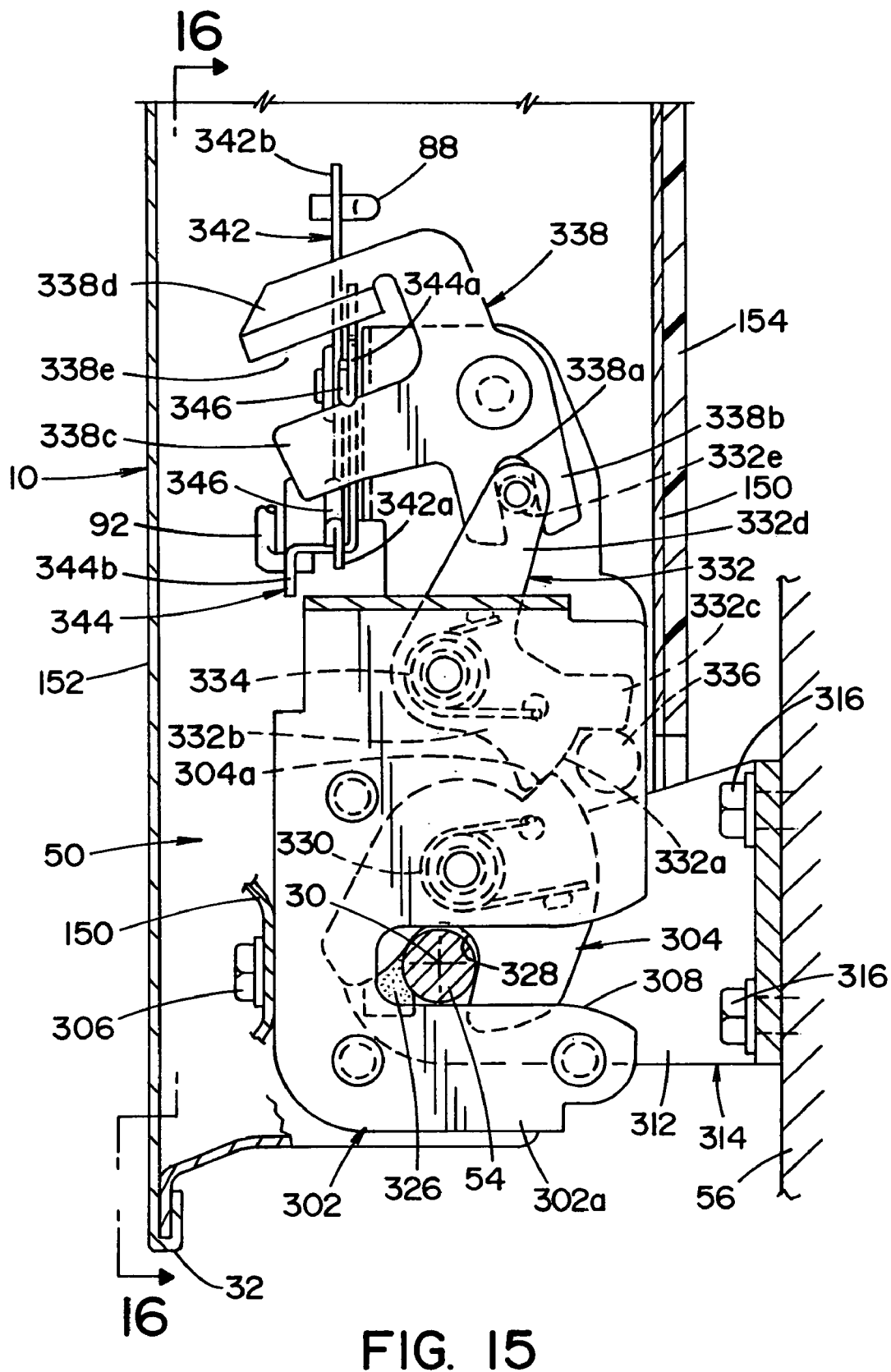
FIG. 15 is a cross-sectional side view of the second hinge/lock assembly taken along the line 15-15 of FIG. 2 showing the second hinge/lock assembly releasably and hingedly connecting the tailgate, shown in a closed position, to the vehicle body.
Figure 16:
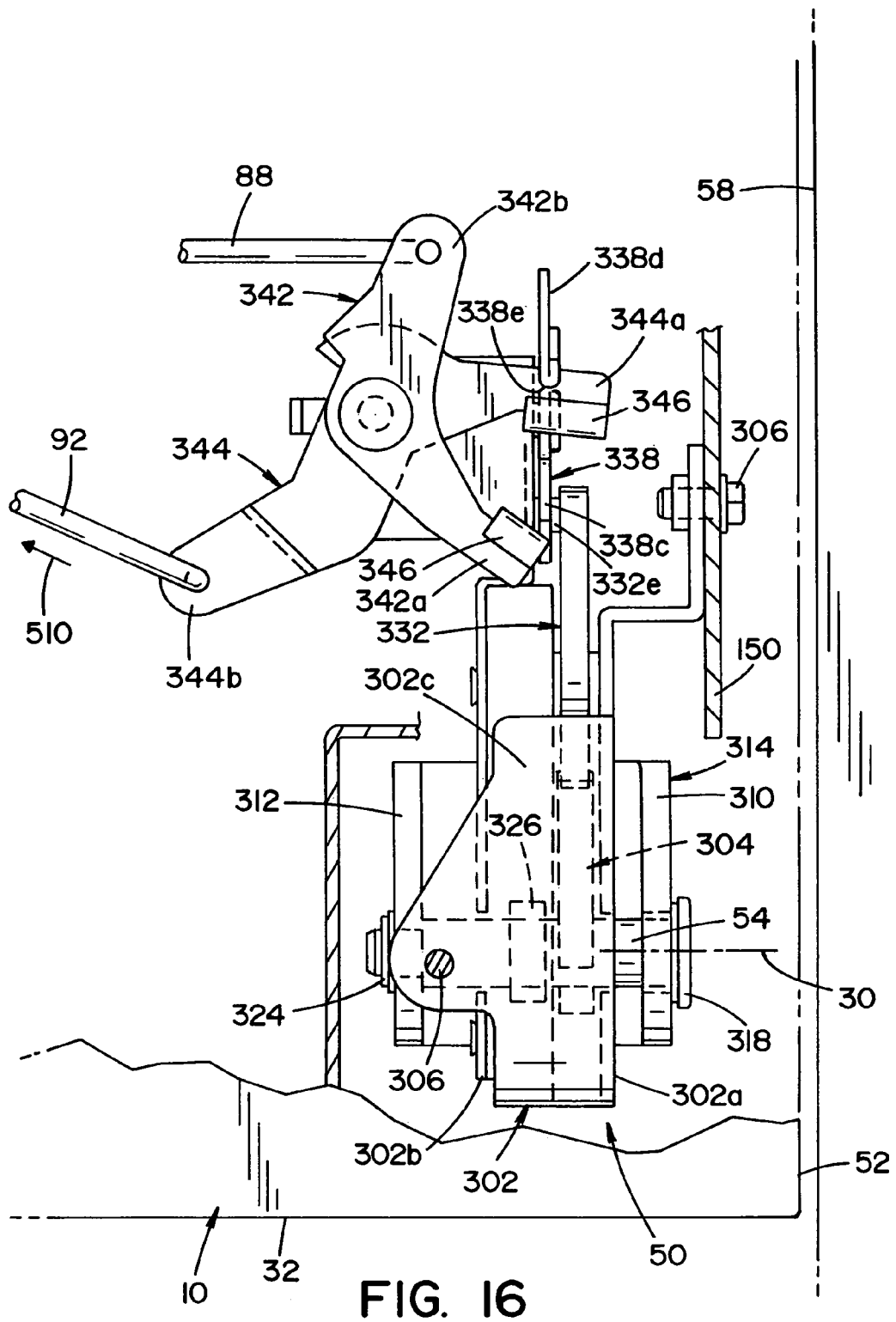
FIG. 16 is a cross-sectional rear view of the second hinge/lock assembly taken along the line 16-16 of FIG. 15 showing the second hinge/lock assembly in a latched position with the tailgate in the closed position.

With specific reference to FIGS. 15 and 16, the tailgate is shown in the closed position and the second hinge/lock assembly 50 is shown in a latched or locked position. In these positions, the striker 54 is received in the lock body recess 308 and the latch 304 is in the latched position thereby locking the striker within the recess 308 and releasably connecting the striker 54 to the lock body 302, which also releasably connects the vehicle body to which the striker 54 is mounted to the tailgate 10 to which the lock body 302 is mounted. The latch 304 is urged toward the unlatched position, but is held in the latched position by the ratchet 332 which is in the engaged position. The ratchet 332 is in the engaged position when locking the latch 304 in the latched position to lock the striker 54 in the lock body recess 308. Specifically, the opposing catch surface 332a of the ratchet engages the catch surface 304a of the latch to maintain the latch in the latched position when the ratchet is in the engaged position.

Figure 17:
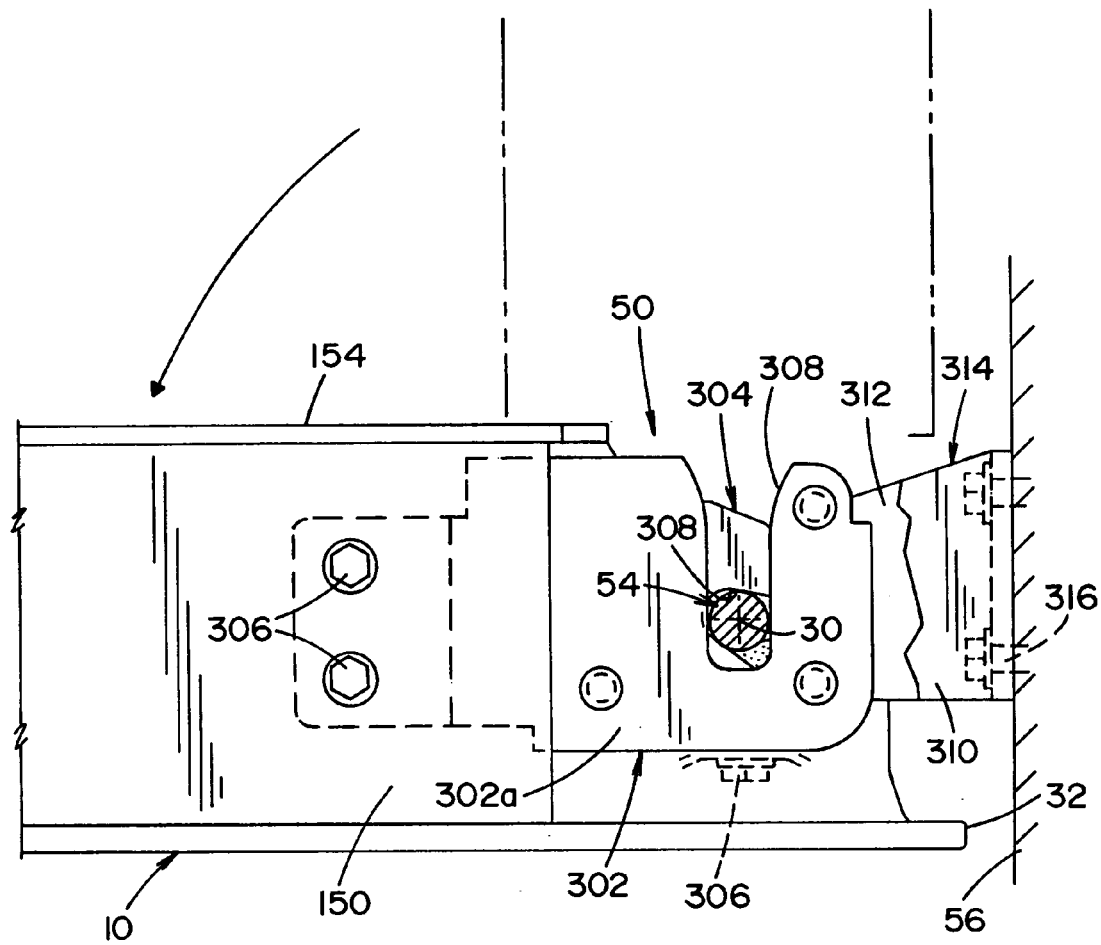
FIG. 17 is a cross-sectional side view of the second hinge/lock assembly of FIG. 15 shown in the latched position with the tailgate in the flip-down position.
Figure 18:
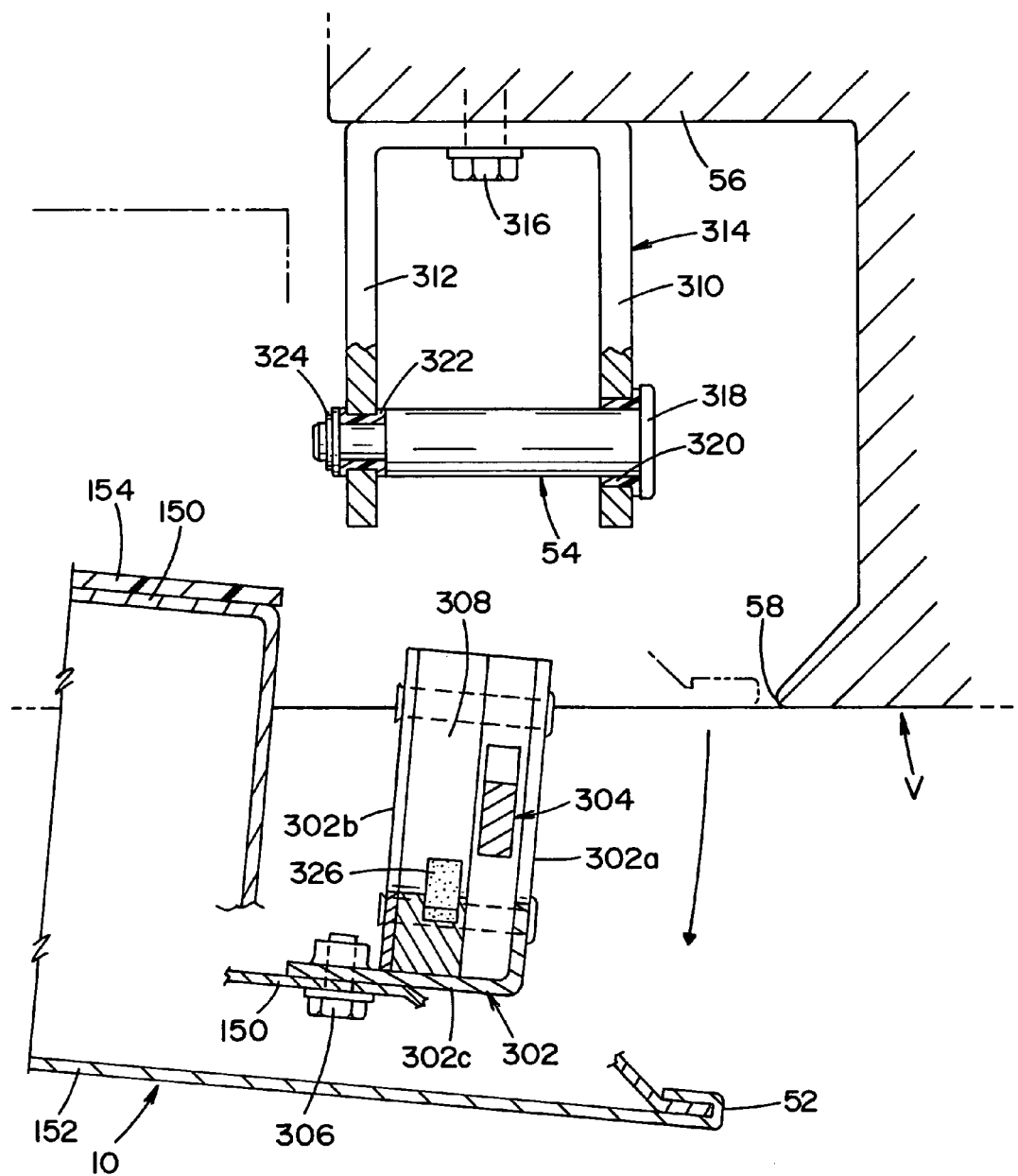
FIG. 18 is a cross-sectional plan view of the second hinge/lock assembly of FIG. 15 shown in an unlatched position with the tailgate moving toward the swing-open position.

When the ratchet 332 in the engaged position, the pin 332e causes the connecting lever 338 to rotate in the second rotatable direction so that the connecting lever second leg 338c and hook portion 338d rotate the sensor lever 344 in the first rotatable direction to a sensor lever first position that corresponds with the latched position of the latch 304 and the engaged position of the ratchet 332. In the sensor lever first position, the sensor rod 92 is moved toward or in the direction of the synchronizer 74, as shown by arrow 510, to a sensor rod first position corresponding to the ratchet engaged position. With reference to FIG. 17, when the striker 54 is locked to the lock body 302, the tailgate 10 is movable toward or to the fold-down position. While opening toward the fold-down position, the lock body 302 pivots about the striker 54 and the latch 304 remains in the latched position to retain the striker 54 within the lock body recess 308. Likewise, the ratchet 332 remains in the engaged position and the sensor lever 344 remains in the sensor lever first position wherein the sensor rod 92 mechanically communicates with the synchronizer 74 by the rod 92 being in the first or forward position in the direction of arrow 510 (FIG. 16).

Figure 19A:
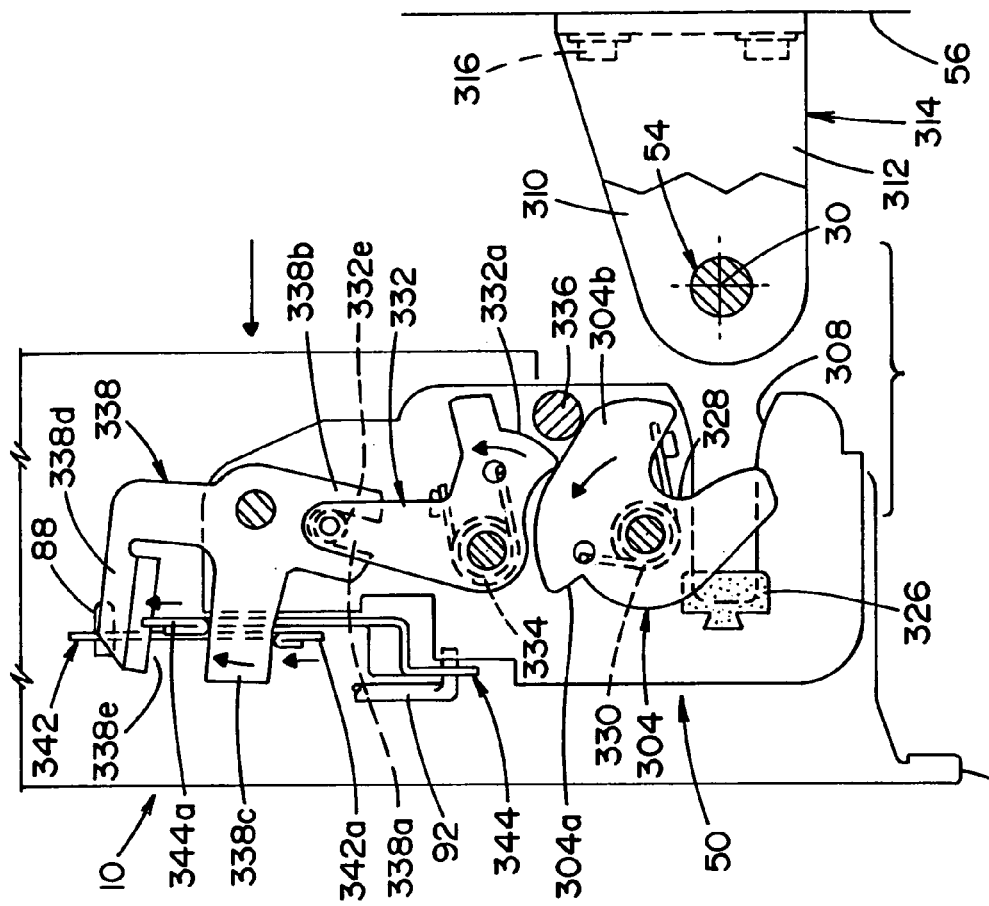
FIG. 19A is schematic side view of the second hinge/lock assembly of FIG. 15 shown in the unlatched position with the tailgate moving toward the swing-open position.
Figure 19B:
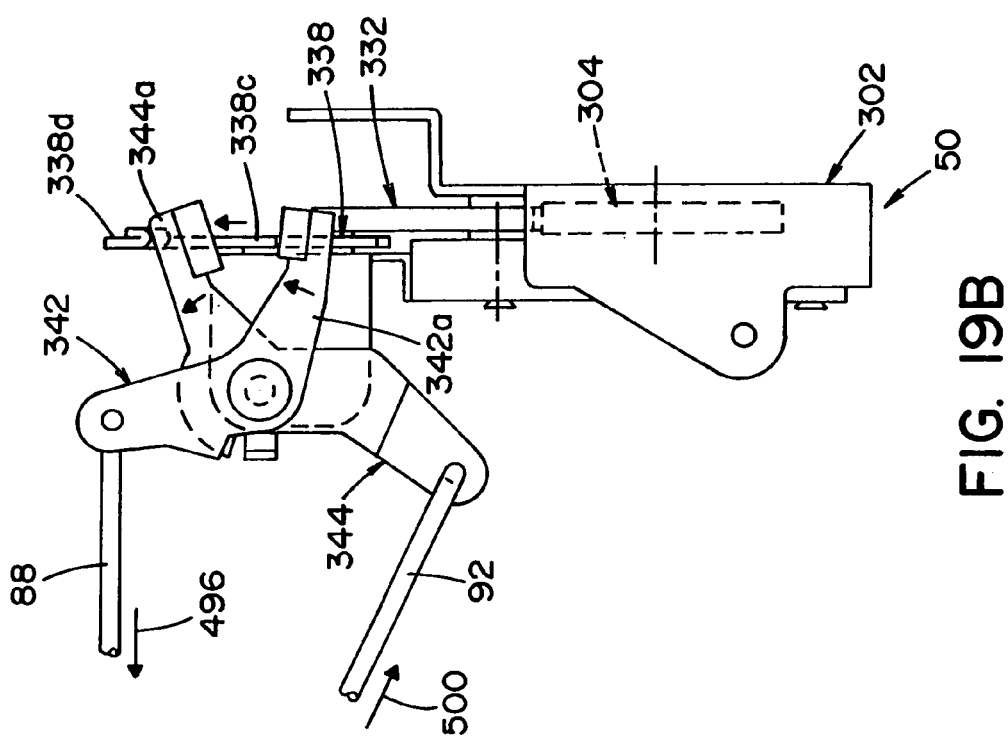
FIG. 19B is a schematic rear view of the second hinge/lock assembly of FIG. 15 shown with a sensor rod mechanically communicating the unlatched position of the second hinge/lock assembly.

To unlock the second hinge/lock assembly 50 from the striker 54, with additional reference to FIGS. 19A and 19B, the synchronizer 74 pulls the actuator rod 88 in a first direction, indicated by arrow 496, which rotates the actuator lever 342 in the second rotatable direction. The leg 342a engages and moves the connector lever 338 in the first rotatable direction which, in turn, engages and moves the pin 332e to rotate the ratchet 332 in the second rotatable direction. Movement of the connecting lever 338 and, specifically, the leg 338c by the actuator rod 88 causes the leg 338c to engage the leg 344a of the sensor lever 344 thereby moving the sensor lever in the second rotatable direction to a sensor lever second position corresponding to the ratchet disengaged position wherein the sensor-rod 92 mechanically communicates with the synchronizer 74 by the rod 92 being in a retracted position in the direction of arrow 500.

The ratchet 332 is moved in the second rotatable direction against the urging of the spring 334 to the disengaged position wherein the opposing catch surface 332a is removed as an obstruction to the latch 304. With the ratchet 332 in the disengaged position, the spring 330 moves the latch 304 to the unlatched position which unlocks the second hinge/lock assembly 50 and allows removal of the striker 54 from the lock body recess 308. More particularly, as the latch 304 moves toward the unlatched position, the latch 304 forcibly moves the striker 54 from the lock body recess 308 which causes the tailgate 10 to at least partially move toward the swing-open position (as shown in FIG. 19A). The stop 336 limits movement of the latch 304 in the second rotatable direction by engaging a first leg 304b of the latch. Thus, the stop 336 holds the latch 304 in the unlatched position.

Figure 20A:
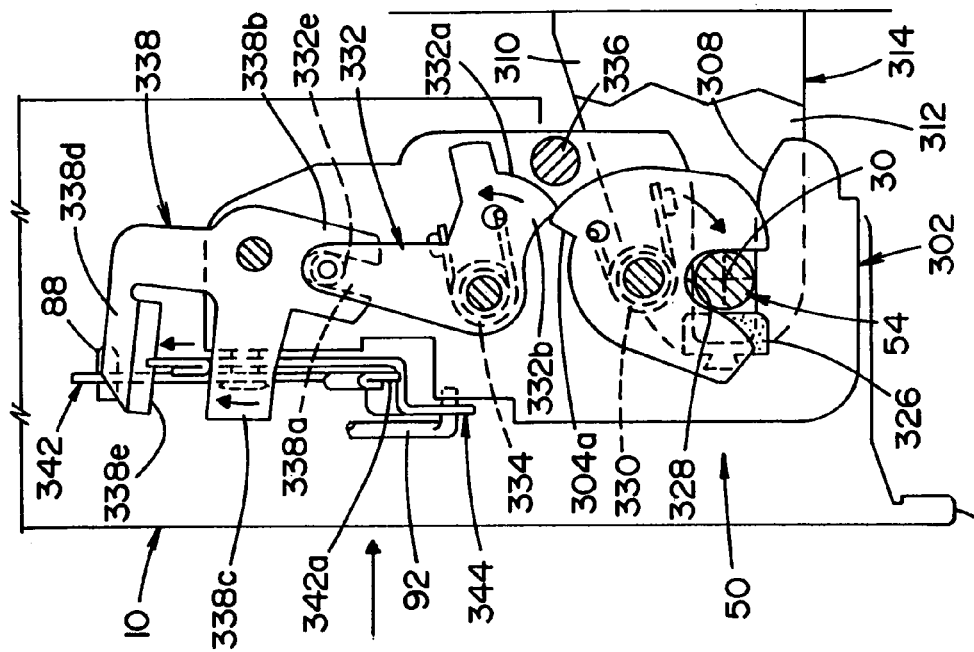
FIG. 20A is a schematic side view of the second hinge/lock assembly of FIG. 15 shown in the latched position with the tailgate in the closed position.
Figure 20B:
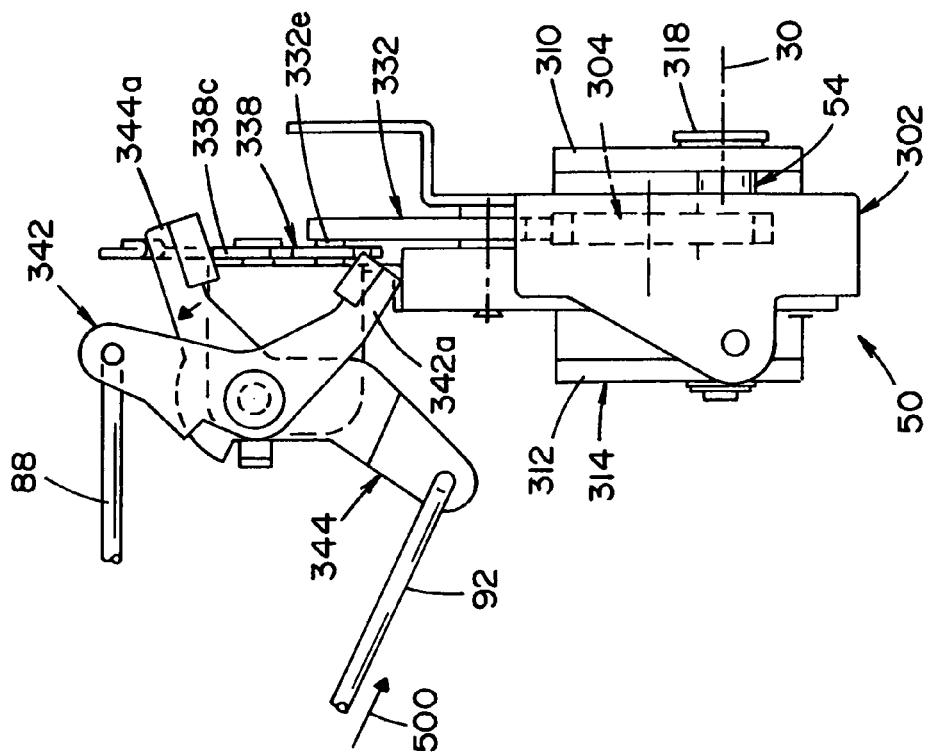
FIG. 20B is a schematic rear view of the second hinge/lock assembly of FIG. 15 shown with the sensor rod mechanically communicating the latched position of the second hinge/lock assembly.

Provided the ratchet 332 remains in the disengaged position, the sensor lever 344 remains in the sensor lever second position and the rod 92 remains in the retracted position. Thus, when the ratchet 332 is in the disengaged position, the sensor rod 92 continues to mechanically communicate to the synchronizer 74 that the second hinge/lock assembly 50 is unlocked by remaining in the retracted position. Until the latch 304 is re-latched onto the striker 54, the ratchet 332, due to its profile or shape, remains in the disengaged position. Thus, the ratchet 332 remains in the disengaged position when the latch is in the unlatched position and/or the latch is moveable between the latched position and the unlatched position. The ratchet 284 is only in the engaged position when the latch is in the latched position. More particularly, with additional reference to FIGS. 20A and 20B, when the striker 54 is initially received or moved in the lock body recess 308 and the latch recess 328 causing the striker 54 to partially rotate the latch in the second rotatable direction against the urging of the spring 330 toward the latched position, the ratchet remains in the disengaged position.

The spring 334 urges the ratchet 332 and, more particularly, the leg 332b into the latch, but, until the latch is rotated to the latched position (shown in FIG. 15), the opposing catch surface 332a of the ratchet does not engage the catch surface 304a of the latch. When the catch surface 304a finally passes the opposing catch surface 332a (i.e., the latch 304 is in the latched position), the ratchet 332 moves into the engaged position to hold the latch in the latched position. When the ratchet 332 is in the engaged position, the pin 332e, in combination with the spring 340, causes the connecting lever 338 to rotate in the second rotatable direction so that the connecting lever leg 338c moves toward the actuator lever 342 which is retracted in the first rotatable direction. When the connecting lever leg 338c moves in the first rotatable direction, the sensor lever 344 also moves in the first rotatable direction. In the illustrated embodiment, as will be discussed in more detail below, the sensor rod 92 is urged in the direction of arrow 500 by spring 456 (FIG. 27) which urges the sensor lever 344 to rotate in the first rotatable direction to the first sensor lever position. The urging of the sensor lever 344 in the first rotatable direction ensures that the leg 344a also remains in engagement with the connecting lever leg 338c. In another embodiment, the connecting lever second leg 338c is replaced by a C-shaped leg defining a recess that receives the sensor lever leg 344a. Thus, movement of the connecting lever in either the first or second rotatable directions has the effect of moving the sensor lever to a corresponding position.

Figure 21:
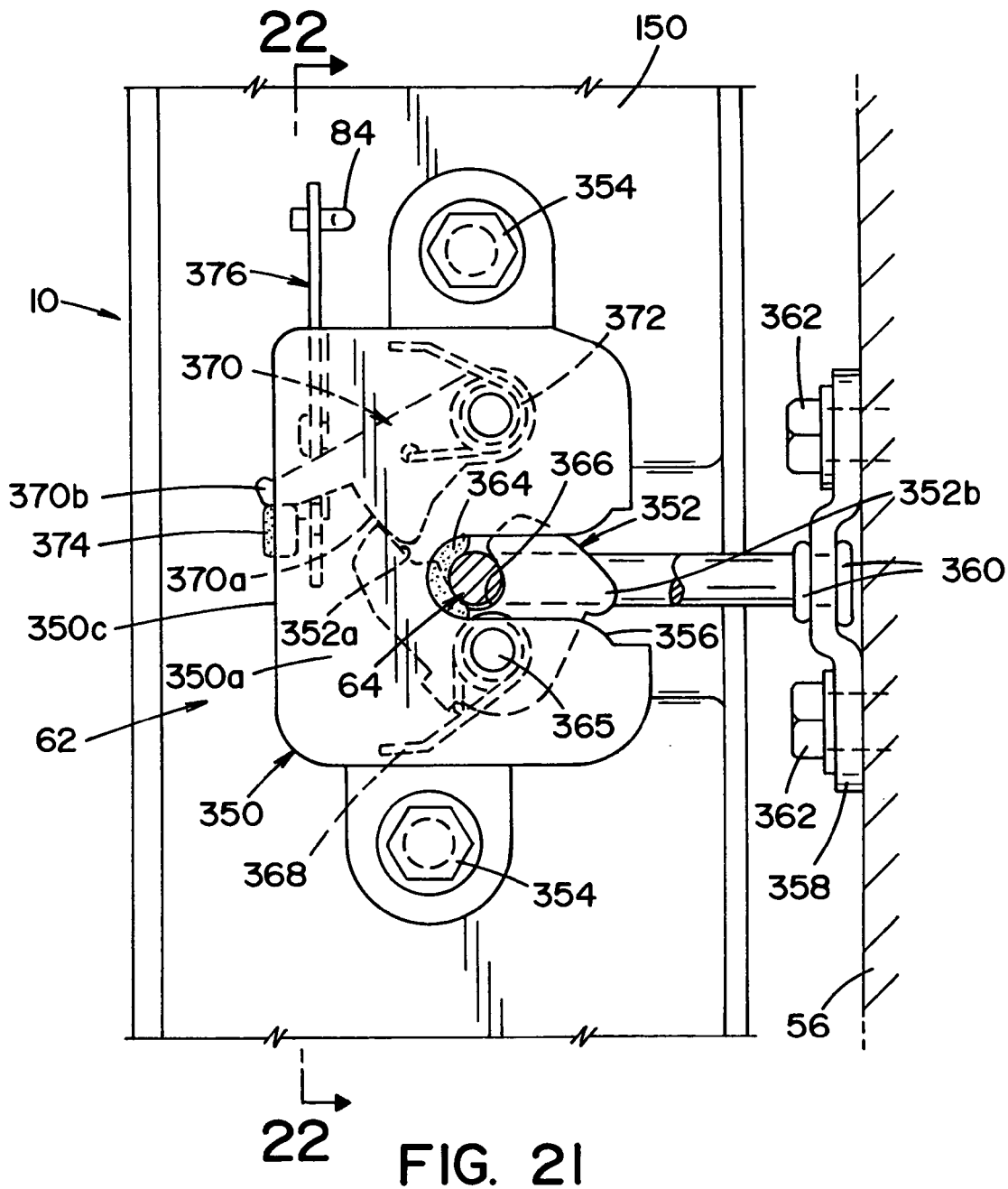
FIG. 21 is a side cross-sectional view of a locking assembly taken along the line 21-21 of FIG. 2 showing the locking assembly releasably connecting the tailgate, shown in a closed position, to the vehicle body.
Figure 22:
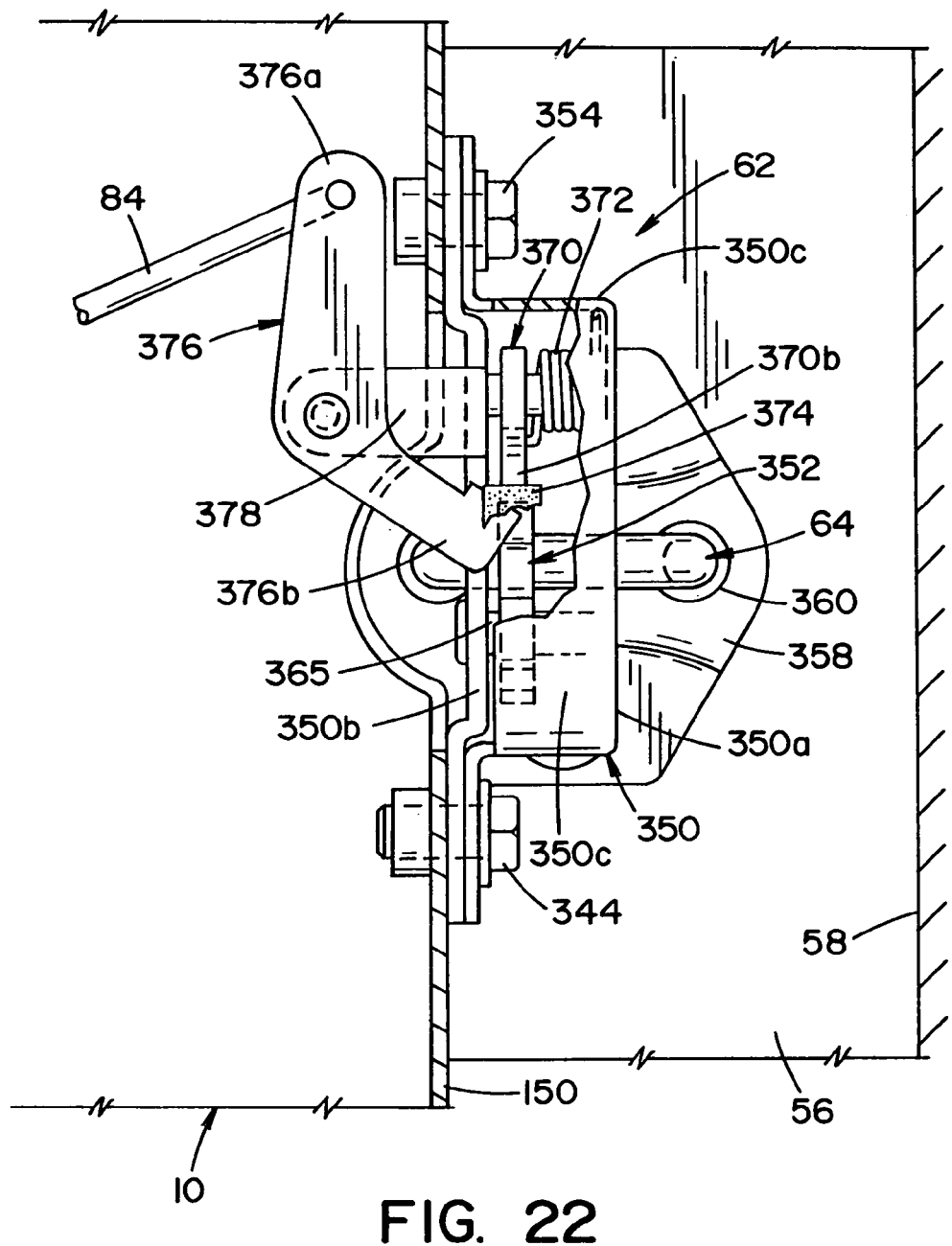
FIG. 22 is a rear cross-sectional view of the locking assembly taken along the line 22-22 of FIG. 21.

With reference to FIGS. 21 and 22, the locking assembly 62 includes a latching assembly having a lock body 350 and latch 352. The lock body 350 is secured to the tailgate and, more specifically, the tailgate frame 150 via conventional fasteners, such as rivets or bolts 354, so that a lock body recess 356 defined in the lock body is aligned with and able to receive the striker 64 when the tailgate 10 is in the closed position. The lock body 350 generally includes a first wall 350a, a second wall 350b spaced from the first wall and at least one connecting wall 350c extending between the first and second walls. The recess 356 is provided through the at least one connecting wall 350c and into portions of the walls 350a,350b.

In the illustrated embodiment, the striker 64 is generally U-shaped and is mounted to a bracket 358 with suitable radial flanges 360 formed integrally with ends of the U-shaped striker 64. The bracket 358 is mounted to the pillar 56 of the vehicle V via conventional fasteners, such as rivets or bolts 362. When the tailgate 10 is in the closed position, the striker 64 is received in the recess 356. A bumper 364, like bumpers 278 and 326, can be provided within the recess 356. The latch 352 is rotatably mounted to the lock body 350 via rivet 365 for selectively latching onto the striker 64 to lock the striker to the lock body 350 thereby locking the locking assembly 62 to the striker 64 and the pillar 56 of the vehicle V.

The latch 352 includes a latch recess 366 for receiving the striker 64. More particularly, as will be described in more detail below, when the tailgate is moved to the closed position from either the swing-open position or the flip-down position and the striker 64 is received in the recesses 356,366, the striker 64 causes the latch 352 to move and, specifically, rotate about the striker 64 to a latched position (shown in FIG. 21) wherein the latch locks the striker 64 in the lock body 350. When the latch 352 is in the unlatched position (shown in FIG. 23A), the striker 64 is freely moveable into and from the recesses 356,366.

The locking assembly 62 also includes a biasing means, such as torsion spring 368, rotatably urging the latch 352 in the first rotatable direction (clockwise in FIG. 21) toward the unlatched position. A ratchet 370 is rotatably mounted to the lock body 350 adjacent the latch 352 for selectively engaging the latch 352 and holding the latch in the latched position. More particularly, the latch 352 includes a catch surface 352a that is selectively engaged by an opposing catch surface 370a defined on the ratchet 370. Another biasing means, such as torsion spring 372, rotatably urges the ratchet 370 in the second rotatable direction (counterclockwise in FIG. 21) toward an engaging position, wherein the opposing catch surface 370a is urged into engagement with the latch 352. The ratchet 370 includes an extending portion 370b that engages a stop 374 to limit movement of the ratchet in the second rotatable direction. The at least one connecting wall 350c limits movement of the latch 352 in the first rotatable direction when the ratchet 370 is in a disengaged position that allows movement of the latch 352 between the latched position and the unlatched position.

When the tailgate is in the closed position and the locking assembly 62 is in the latched or locked position, the striker 64 is received in the lock body recess 356 and the latch 352 is in the latched position thereby locking the striker within the recess 356 and releasably connecting the striker 64 to the lock body 350, which also releasably connects the vehicle body to which the striker 64 is mounted to the tailgate to which the lock body 350 is mounted. Though the latch 352 is urged toward the unlatched position, the latch is held in the latched position by the ratchet 370 which is in the engaged position. Particularly, the opposing catch surface 370a of the ratchet engages the catch surface 352a of the latch to maintain the latch in the latched position.

Figure 23A:
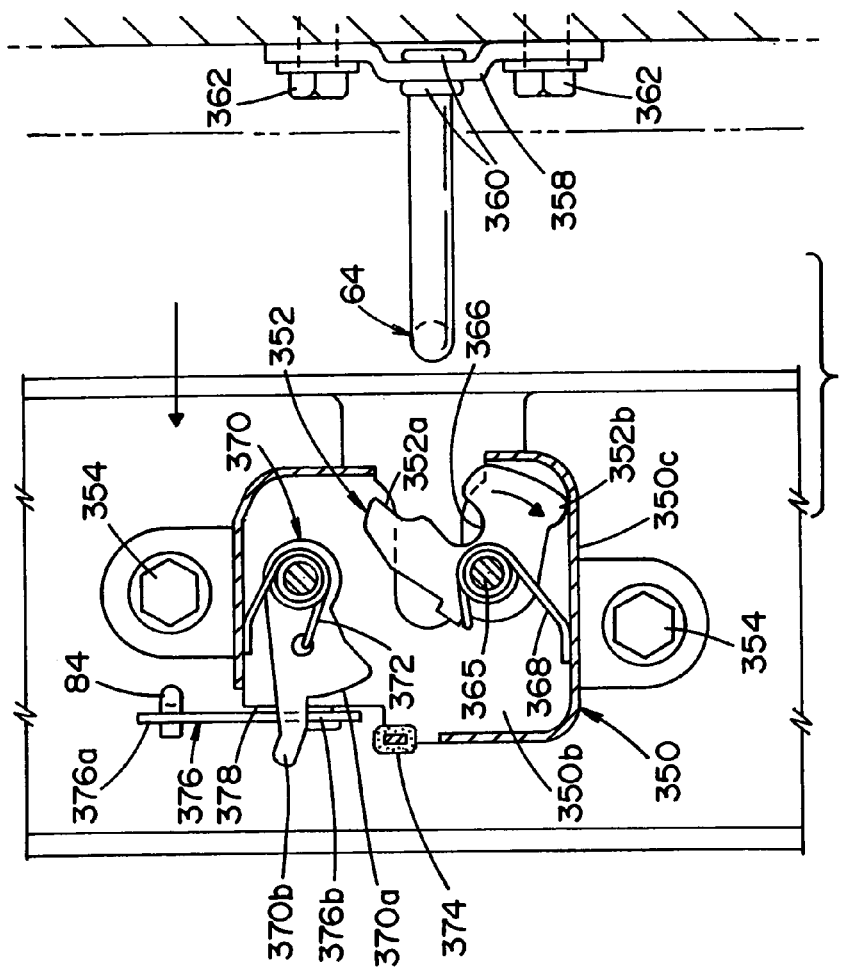
FIG. 23A is a schematic side view of the locking assembly of FIG. 21 shown in an unlatched position.
Figure 23B:
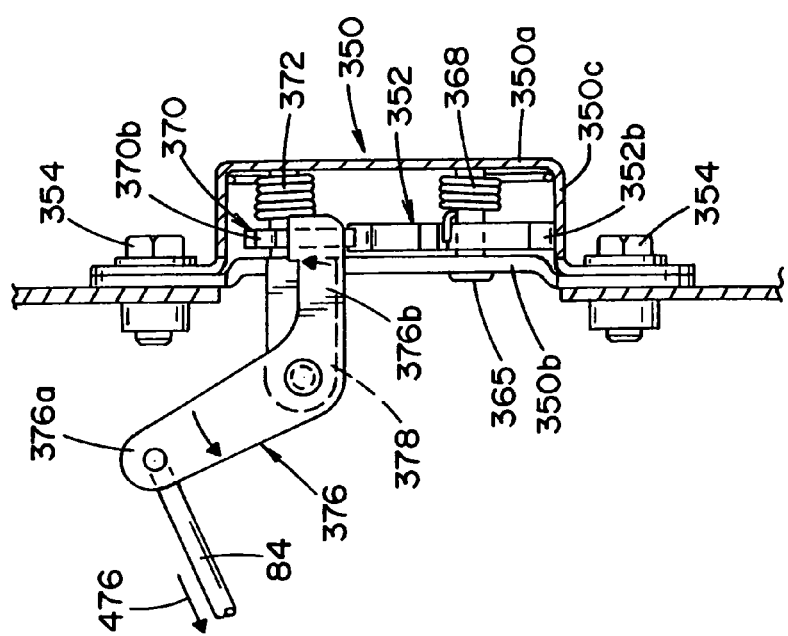
FIG. 23B is a schematic rear view of the locking assembly of FIG. 21 showing an actuator rod moved to unlatch the locking assembly from the vehicle body.
Figure 24:
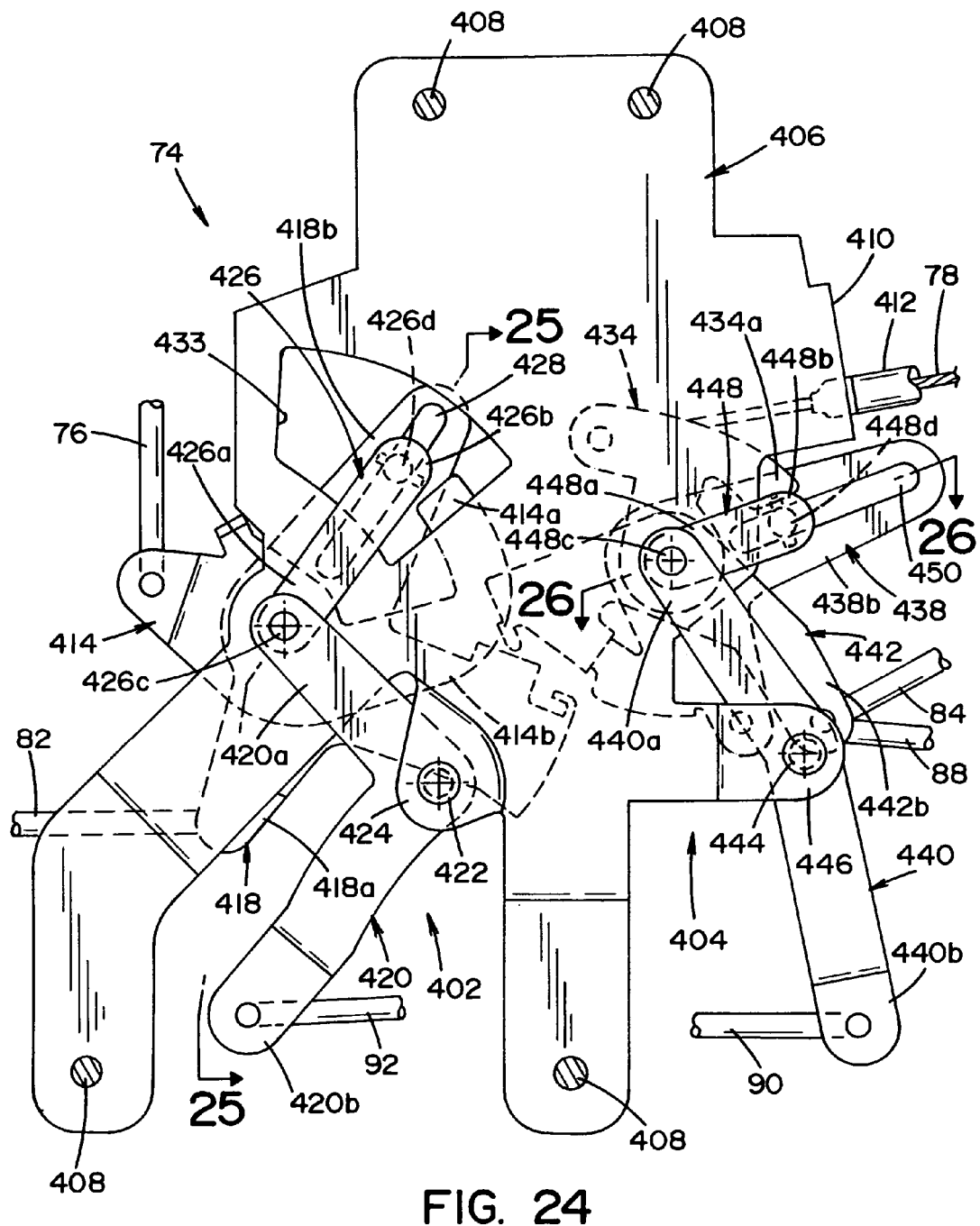
FIG. 24 is a rear elevational view of a synchronizer controlling mechanical communication between the handle assemblies, the hinge/lock assemblies and the locking assembly.
Figure 25:
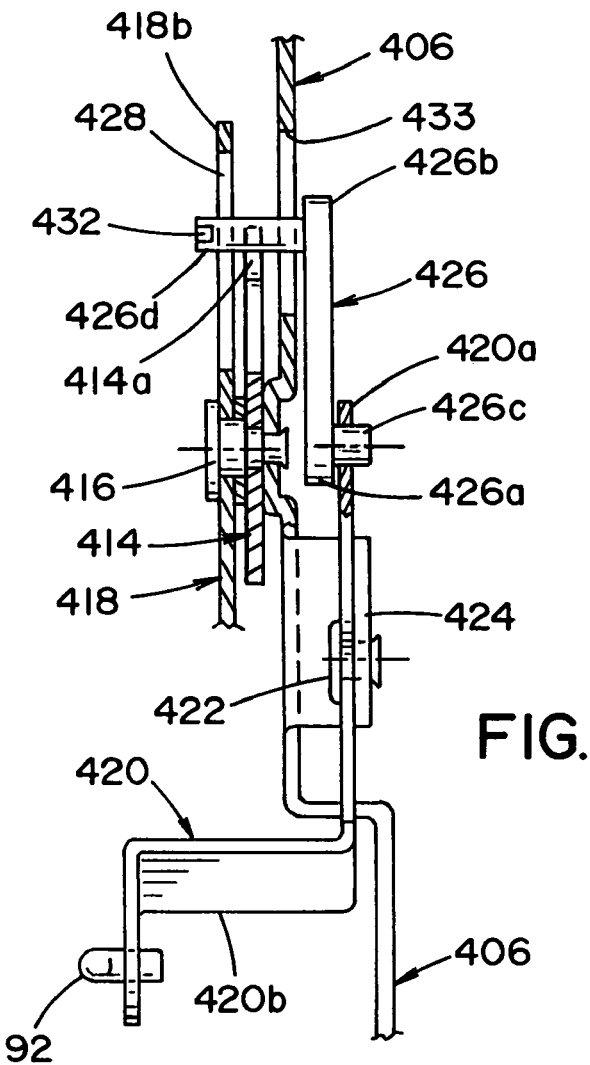
FIG. 25 is a cross-sectional view of the synchronizer taken along the line 25-25 of FIG. 24.
Figure 26:
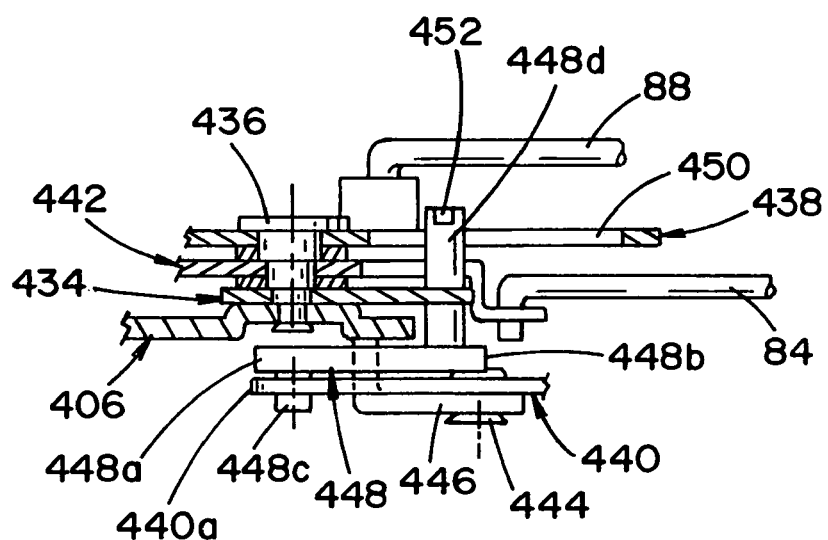
FIG. 26 is a cross-sectional view of the synchronizer taken along the line 26-26 of FIG. 24.

To unlock the locking assembly 60 from the striker 64, with additional reference to FIGS. 23A and 23B, the synchronizer 74 pulls the actuator rod 84 in the direction of arrow 476 which rotates an actuator lever 376 in the second rotatable direction (counterclockwise in FIG. 23B). The lever 376 is pivotally mounted to a flange 378 so that the lever 376 is approximately normal relative to the latch 352 and the ratchet 370 and generally parallel to the tailgate 10. Movement of the lever 376, which has a first leg 376a pivotally connected to the rod 84, in the second rotatable direction causes a second leg 376b of the lever to engage and rotate the ratchet 370 in the first rotatable direction against the urging of the spring 372 to the disengaged position wherein the opposing catch surface 370a is removed as an obstruction to the latch 352. With the ratchet 370 in the disengaged position, the spring 368 moves the latch 352 to the unlatched position which unlocks the locking assembly 62 and allows removal of the striker 64 from the lock body 350. More particularly, as the latch 352 moves toward the unlatched position, the latch 352 forcibly moves the striker 64 from the lock body recess 356 which causes the tailgate 10 to at least partially move toward one of the open positions (i.e., the swing-open position or the flip-down position). The lock body wall 350c limits movement of the latch 352 in the first rotatable direction by engaging a first leg 352b of the latch.

With reference to FIG. 24-27, the synchronizer 74 is shown in a resting or tailgate closed position, wherein each of the assemblies 44,50,62 are locked to their respective strikers and neither of the handles 80,86 are pulled or actuated. The synchronizer 74 includes a plurality of levers connected to the tailgate for coordinating operation between the handle assemblies 70,72 and the hinge/lock and locking assemblies 44,50,62. More particularly, the synchronizer 74 includes (1) a first set of levers 402 connected to the actuator rod 82, the sensor rod 92 and the handle rod 76 and (2) a second set of levers 404 connected to the actuator rods 84,88, the sensor rod 90 and the handle cable 78. The sets of levers 402,404 are rotatably connected to a mounting bracket 406 which is secured to the tailgate 10 via suitable fasteners, such as rivets or bolts 408. Thus, the sets of levers 402,404 are rotatably mounted to the tailgate 10. The bracket 406 includes a flange portion 410 having a cable support 412 mounted thereto for supporting and guiding the cable 78 into the synchronizer 74.

The first set of levers 402 includes a first or upper handle lever 414 pivotally connected to the upper handle rod 76 so that the lever 414 moves when the handle 80 is moved. The lever 414 is pivotally mounted to the bracket 406 by pivot member 416. The first set 402 additionally includes a first hinge/lock actuation lever 418 and a second hinge/lock sensor lever 420. The actuation lever 418, which is adjacent the upper handle lever 414, has a first arm 418a pivotally connected to the actuation rod 82 and is pivotally mounted to the bracket 406 by the pivot member 416. As will be described in more detail below, the actuation lever 418 is selectively moveable by the upper handle 80 and is connected to the first hinge/lock assembly 44 so that the lever 418 unlocks the first hinge/lock assembly when sufficiently moved by the handle 80. The sensor lever 420 is pivotally connected to the sensor rod 92 and pivotally mounted to the bracket 406 by a pivot member 422. More specifically, the sensor lever 420 is pivotally connected to an L-shaped portion or flange 424 of the bracket 406. A pin lever 426 is pivotally connected adjacent a first end 426a to a first leg 420a of the sensor lever and adjacent a second end 426b to the actuation lever 418. A second leg 420b is pivotally connected to the sensor rod 92.

In the illustrated embodiment, the pin lever 426 includes a pin 426c received through the sensor lever 420 to rotatably connect the pin lever 426 to the sensor lever 420. The second end 426b of the pin lever includes another pin 426d extending through an aperture or slot 428 defined in a second arm 418b of the actuation lever 418. The pin 426d includes radial portions or extensions 432 which prevent axial pullout of the pin from the slot 428. The pin 426d also extends through an opening 433 defined in the bracket 406. As will be described in more detail below, the pin 426d is selectively positionable for engagement with an engaging portion 414a of a first arm 414b of the upper handle lever 414.

The second set of levers 404 includes a lower handle lever 434 pivotally connected to the cable 78 so that the lever 434 moves when the handle 86 is moved. The lever 434 is pivotally mounted to the bracket 406 by pivot member 436. The second set 404 additionally includes a second hinge/lock actuation lever 438, a first hinge/lock sensor lever 440 and a locking assembly actuation lever 442. The actuation lever 438, which is adjacent the lower handle lever 434, includes a first arm 438a that is pivotally connected to the actuation rod 88 and is itself pivotally mounted to the bracket 406 by the pivot member 436. As will be described in more detail below, the actuation lever 438 is selectively moveable by the lower handle 86 and is connected to the second hinge/lock assembly 50 so that the lever 438 unlocks the second hinge/lock assembly when sufficiently moved by the handle 86. The sensor lever 440 is pivotally connected to the sensor rod 90 and pivotally mounted to the bracket 406 by pivot member 444. More specifically, the sensor lever 440 is pivotally connected to an L-shaped portion or flange 446 of the bracket 406. A pin lever 448 is pivotally connected adjacent a first end 448a to a first leg 440a of the sensor lever 440 and adjacent a second end 438b to the actuation lever 438. A second leg 440b is pivotally connected to the sensor rod 90.

In the illustrated embodiment, the pin lever 448 includes a pin 448c received through the sensor lever 440 to rotatably connect the pin lever 448 to the sensor lever 440. The second end 448b of the pin lever 448 includes another pin 448d extending through an aperture or slot 450 defined in a second arm 438b of the actuator lever 438. The pin 448d includes radial portions or extensions 452 which prevent axial pullout of the pin from the slot 450. As will be described in more detail below, the pin 448d is selectively positionable for engagement with an engaging portion 434a of a first arm 434b of the lower handle lever 434. The locking assembly lever 442 includes a first arm 442a pivotally connected to the rod 84.

As will be appreciated by those skilled in the art, a plurality of springs are provided for biasing or urging several of the levers in a first or second rotatable direction. The springs are illustrated only in FIG. 27 and only schematically. All of the schematically illustrated springs are shown having a first end connected to one of the levers and a second end connected to a schematically illustrated fixed member (which may be the bracket 406 or some other component of the tailgate 10, such as the frame 150, for example). Those skilled in the art will appreciate that other biasing means could be used in place of the illustrated springs, including, for example, other springs (such as torsion springs), the orientation of a particular lever relative to gravity, etc., and all such other means are to be considered within the scope of the present invention.

More particularly, the plurality of springs includes a spring 454 connected to the first hinge/lock assembly actuation lever 418 and urging the lever to rotate in the second rotatable direction (counterclockwise in FIG. 27) about the pivot member 416. Another spring 456 is connected to the second hinge/lock assembly sensor lever 420 and urges the lever 420 to rotate in the second rotatable direction about the pivot member 422. Spring 458 is connected to the lower handle lever 434 and urges the lever 434 to rotate in the first rotatable direction (clockwise in FIG. 27) about the pivot member 436. Spring 460 is connected to the first hinge/lock assembly sensor lever 440 and urges the lever 440 to rotate in the first rotatable direction about the pivot member 444. Spring 462 is connected to the locking assembly lever 442 and urges the lever 442 to rotate in the first rotatable direction about the pivot member 436.

As will be described more specifically below, FIGS. 28-32 illustrate the operation of the synchronizer 74 in coordinating and mechanically communicating with the handle assemblies 70,72 and the lock assemblies 44,50,62. Based on the states or positions of the first and second hinge/lock assemblies 44,50, as communicated by the sensor rods 90,92, the synchronizer 74 selectively enables or disables communication between (1) the upper handle assembly 70 and the first hinge/lock and locking assemblies 44,62 and (2) the lower handle assembly 72 and the second hinge/lock and locking assemblies 50,62. More particularly, if the first and second hinge/lock assemblies 44,50 are both latched onto their respective strikers 48,54, the sensor rods 90,92 mechanically communicate the respective latched positions of the assemblies 44,50 to the synchronizer 74 which then enables either of the handle assemblies 70,72 to be operational for opening the tailgate 10.

If the first hinge/lock assembly 44 is unlatched or unlocked from the striker 48, the sensor rod 90 mechanically communicates the unlatched position of the assembly 44 to the synchronizer 74 which then disables the lower handle assembly 72 from opening or unlatching the assemblies 50,62. Conversely, if the first hinge/lock assembly 44 is latched or locked, the sensor rod 90 mechanically communicates the latched position of the assembly 44 to the synchronizer 74 which enables the lower handle assembly 72 to open or unlatch the assemblies 50,62. If the second hinge/lock assembly 50 is unlatched or unlocked from the striker 54, the sensor rod 92 mechanically communicates the unlatched position of the assembly 50 to the synchronizer 74 which then disables the upper handle assembly 70 from opening or unlatching the assemblies 44,62. Conversely, if the second hinge/lock assembly 50 is latched or locked, the sensor rod 92 mechanically communicates the latched position of the assembly 50 to the synchronizer 74 which enables the upper handle assembly 70 to open or unlatch the assemblies 44,62. The synchronizer 74 additionally prevents simultaneous operation of both handle assemblies 70,72 to release all the assemblies 44,50,62 simultaneously. When the handle assemblies 70,72 are disabled from operating and unlatching the assemblies 44,50,62, the handles 80,86 are still permitted freedom of movement.

Figure 28:
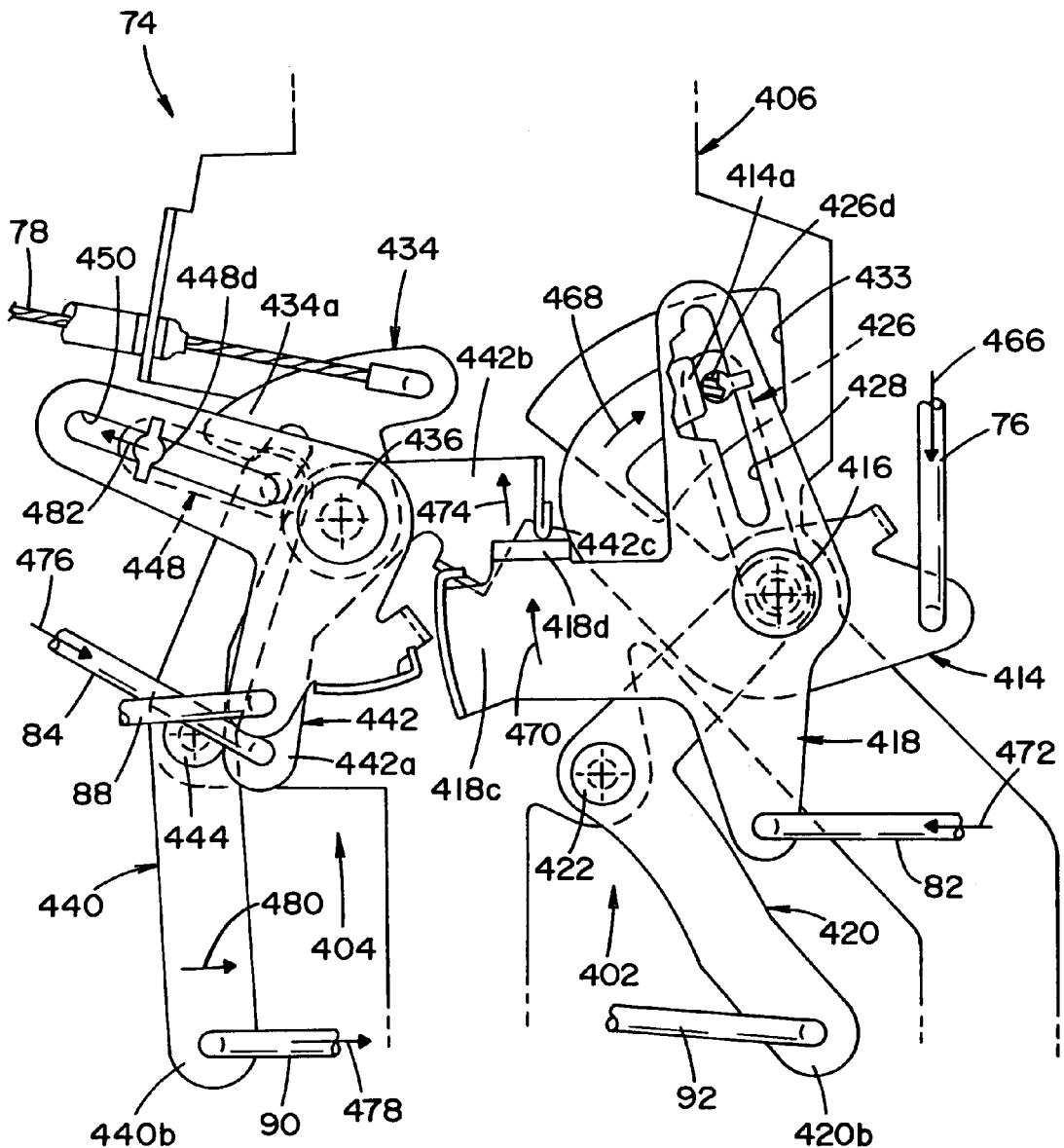
FIG. 28 is a schematic front view of the synchronizer of FIG. 24 shown with the tailgate in the flip-down position.

In operation, when the upper handle 80 (FIG. 2) is pulled, its stroke is communicated to the synchronizer 74 through rod 76. With reference to FIG. 28, pulling of the upper handle 80 causes the rod 76 to move toward the synchronizer 74, in the direction of arrow 466, thereby rotating the upper handle lever 414 in the first rotatable direction or arrow 468. If the second hinge/lock assembly 50 is in the locked or latched position when the handle 80 is pulled, the synchronizer 74 connects the stroke of the rod 76 to the rods 82,84 which unlocks the assemblies 44,62 and enables the tailgate 10 to be opened toward the flip-down position. More particularly, provided the tailgate 10 is closed and all the assemblies 44,50,62 are locked (i.e., the synchronizer 74 starts from its resting position shown in FIGS. 24-27), rotation of the lever 414 in the direction of arrow 468 causes the engaging arm 414a to engage and forcibly move the pin 426d, which is in a first position. Since the pin 426d is received in the slot 428, forced movement of the pin 426d by the engaging arm 414a causes rotation of the first hinge/lock actuation lever 418 in the first rotatable direction, represented by arrow 470, against the urging of the spring 454.

Rotation of the lever 418 in the direction of arrow 470 pulls the rod 82 toward the synchronizer in the direction of arrow 472 which, as described above, unlatches or unlocks the first hinge/lock assembly 44. Rotation of the lever 418 in the direction of arrow 470 also causes a third arm 418c of the lever 418 having a first engaging portion 418d to engage and forcibly move the second arm 442b (and, more specifically, an engaging portion 442c of the second arm) of the locking assembly lever 442 thereby rotating the lever 442, against the urging of the spring 462, in the second rotatable direction represented by arrow 474. Rotation of the lever 442 in the direction of arrow 474 pulls the rod 84 toward the synchronizer in the direction of arrow 476 which, as described above, unlatches or unlocks the locking assembly 62.

When the first hinge/lock assembly 44 is unlocked, the sensor rod 90 moves to its retracted position, represented by arrow 478 due to the movement of the lever 292 (FIG. 12) when the first hinge/lock assembly is in an unlocked condition, as described above. Pulling of the rod 90 causes the sensor lever 440 to rotate in the second rotatable direction, represented by arrow 480, against the urging of the spring 460 which causes the pin lever 448 with the pin 448d to move in the direction of arrow 482 along the slot 450 to a second position. As will be described in more detail below, movement of the pin 448d along the slot 450 away from the engaging portion 434a of the lower handle lever 434 disengages or disables use of the lower handle 86 for purposes of unlocking the assemblies 50,62.

Figure 29:
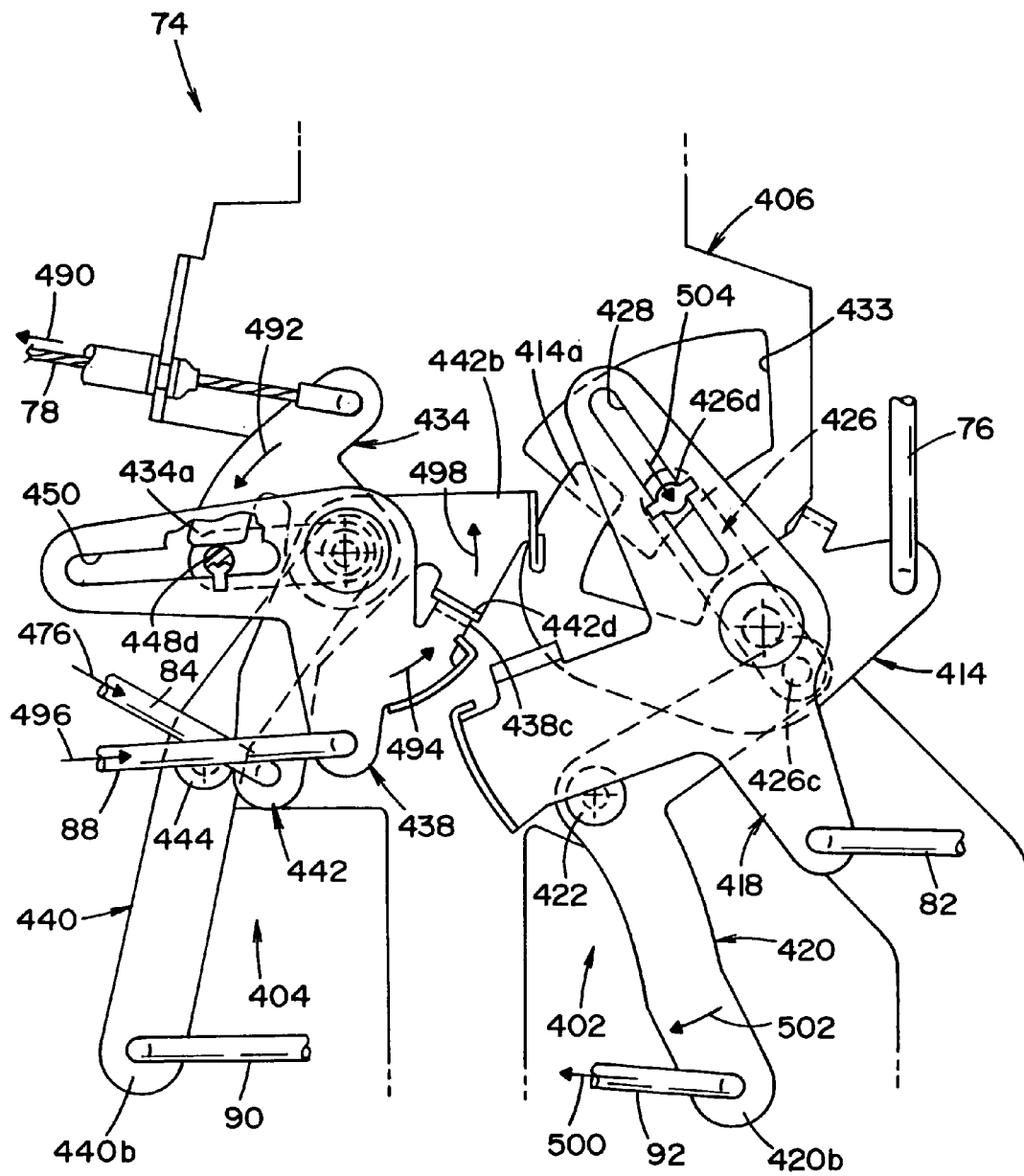
FIG. 29 is a schematic front view of the synchronizer of FIG. 24 shown with the tailgate in the swing-open position.

With reference to FIG. 29, when the lower handle 86 (FIG. 2) is pulled, its stroke is communicated to the synchronizer 74 through the cable 78. More particularly, pulling of the lower handle 86 causes the cable to move away from the synchronizer 74, in the direction of arrow 490, thereby rotating the lower handle lever 434 in the second rotatable direction or arrow 492. If the second hinge/lock assembly 50 is in the unlocked or unlatched position when the handle 80 is pulled, the synchronizer 74 does not connect the stroke of the rod 76 to the rods 82,84 and the upper handle 80 is prevented from opening the tailgate 10. More particularly, provided the tailgate 10 is closed and all the assemblies 44,50,62 (i.e., the synchronizer 74 starts from its resting position), rotation of the lever 434 in the direction of arrow 492 causes the engaging arm 434a to engage and forcibly move the pin 448d, which is in a first position. Since the pin 448d is received in the slot 450, forced movement of the pin 448d by the engaging arm 434a causes rotation of the second hinge/lock actuation lever 438 in the second rotatably direction, represented by arrow 494.

Rotation of the lever 438 in the direction of arrow 494 pulls the rod 88 toward the synchronizer in the direction of arrow 496 which, as described above, unlatches or unlocks the second hinge/lock assembly 50. Rotation of the lever 438 in the direction of arrow 494 also causes an engaging portion 438c to engage a second engaging portion 442d of the first arm 442b of the lever 442 thereby rotating the lever 442, against the urging of the spring 462, in the second rotatable direction represented by arrow 498 which pulls lever 84 in the direction of arrow 476 to unlock or unlatch the locking assembly 62.

When the second hinge/lock assembly 50 is unlocked, the sensor rod 92 moves to its retracted position, represented by arrow 500 due to the movement of the lever 344 (FIG. 16) when the second hinge/lock assembly is in an unlocked condition, as described above. Pulling of the rod 92 causes the sensor lever 420 to rotate in the first rotatable direction, represented by arrow 502, against the urging of the spring 456 which causes the pin lever 426 with the pin 426d to move in the direction of arrow 504 along the slot 428 to a second position. As will be described in more detail below, movement of the pin 426d along the slot 428 away from the engaging portion 414a of the upper handle lever 414 disengages or disables use of the upper handle 80 for purposes of unlocking the assemblies 44,62.

Figure 30:
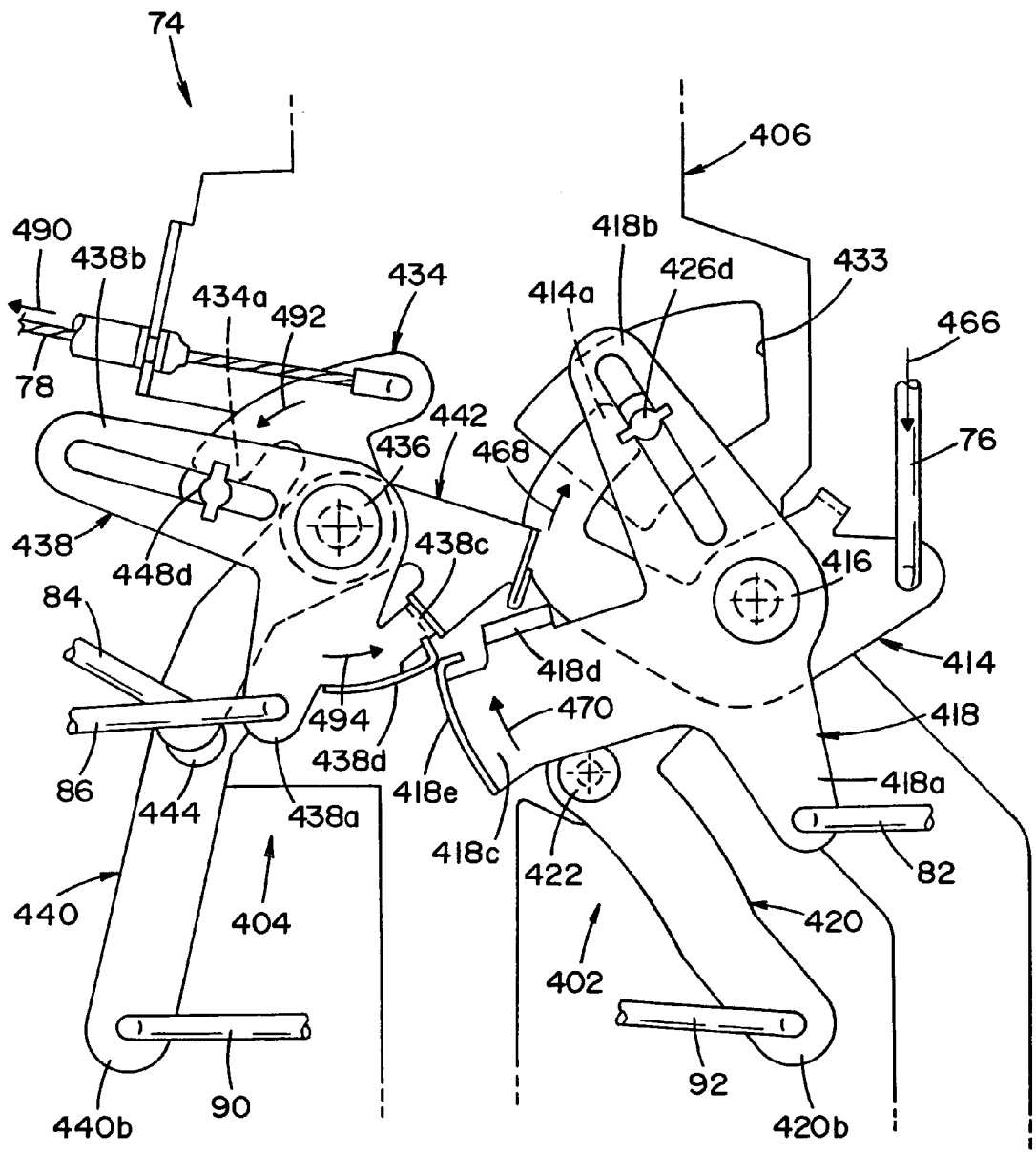
FIG. 30 is a schematic front view of the synchronizer of FIG. 24 shown with the tailgate in the closed position and both handles being pulled simultaneously.

With reference to FIG. 30, the synchronizer 74 is configured to prevent both handles 80,86 from simultaneously unlocking the first and second hinge/lock assemblies 44,50. Generally, one of the handles 80,86 will have its stroke communicated to the synchronizer 74 prior to the other of the handles 80,86, even when both handles are attempted to be pulled simultaneously. As long as one of the handles 80,86 has its stroke communicated to the synchronizer 74 prior to other of the handles 8086, the handle having its stroke communicated last will be disengaged or disabled and unable to unlock the assemblies to which it is otherwise operable to unlock. Should both handles 80,86 have their strokes communicated to the synchronizer 74 simultaneously, an engagement between the first set of 402 and the second set of levers 404 prevents operation of either of the handles and does not permit either of the handles from unlocking any of the assemblies 44,50,62

For example, when the upper handle 80 is pulled, the rod 76 moves in the direction of arrow 466 which rotates the upper handle lever 414 in the direction of arrow 468. If, at approximately the same time, the lower handle 86 is pulled, the cable 78 moves in the direction of arrow 490 which rotates the lower handle lever 434 in the direction of arrow 492. If the levers 414,434 rotate at the same time, then their respective engaging portions 414a,434a simultaneously engage corresponding pins 426d,448d. As already discussed, movement of the pins 426d,448d by the portions 414a,438a causes levers 418,438 to rotate, respectively, in the directions of arrows 470,494, i.e., the lever 418 rotates clockwise in FIG. 30 and the lever 438 rotates counterclockwise in FIG. 30. Rather than sufficiently rotating (i.e., some rotation of the levers 414,434 can occur simultaneously but not sufficient rotation) to pull the rods 82,88 and unlock the hinge/lock assemblies 44,50 or rotating enough to engage and rotate lever 442 (to pull rod 84), the simultaneously rotating levers 418,438 engage and obstruct one another and disable both handles 80,86 from operating any of the assemblies 44,50,62. More particularly, third engaging portions 418e,438d of the levers 418,438 engage one another and prevent both levers from further rotating.

If the second hinge/lock assembly 50 is in the unlocked or unlatched position when the handle 80 is pulled, the synchronizer 74 does not connect the stroke of the rod 76 to the rods 82,84 and the upper handle 80 is prevented or disabled from opening the tailgate 10. However, even when the upper handle 80 is prevented from opening the tailgate, the upper handle 80 is still moveable, just not operational. More particularly, as already described with reference to FIG. 29, when the second hinge/lock assembly 50 is unlocked, the pin 426d is moved away from the engaging portion 414a along the slot 428 to the second position. With additional reference to FIG. 31, with the pin 426d moved away from the engaging portion 414a, movement of the upper handle 80 is still permitted and its stroke (represented by arrow 466) is still communicated to the synchronizer through the rod 76. However, rotation of the upper handle lever 414 does not result in the unlocking of the first hinge/lock assembly 44 (the second hinge/lock assembly 50 and the locking assembly 62 are assumed to be unlocked in FIG. 31).

Figure 31:
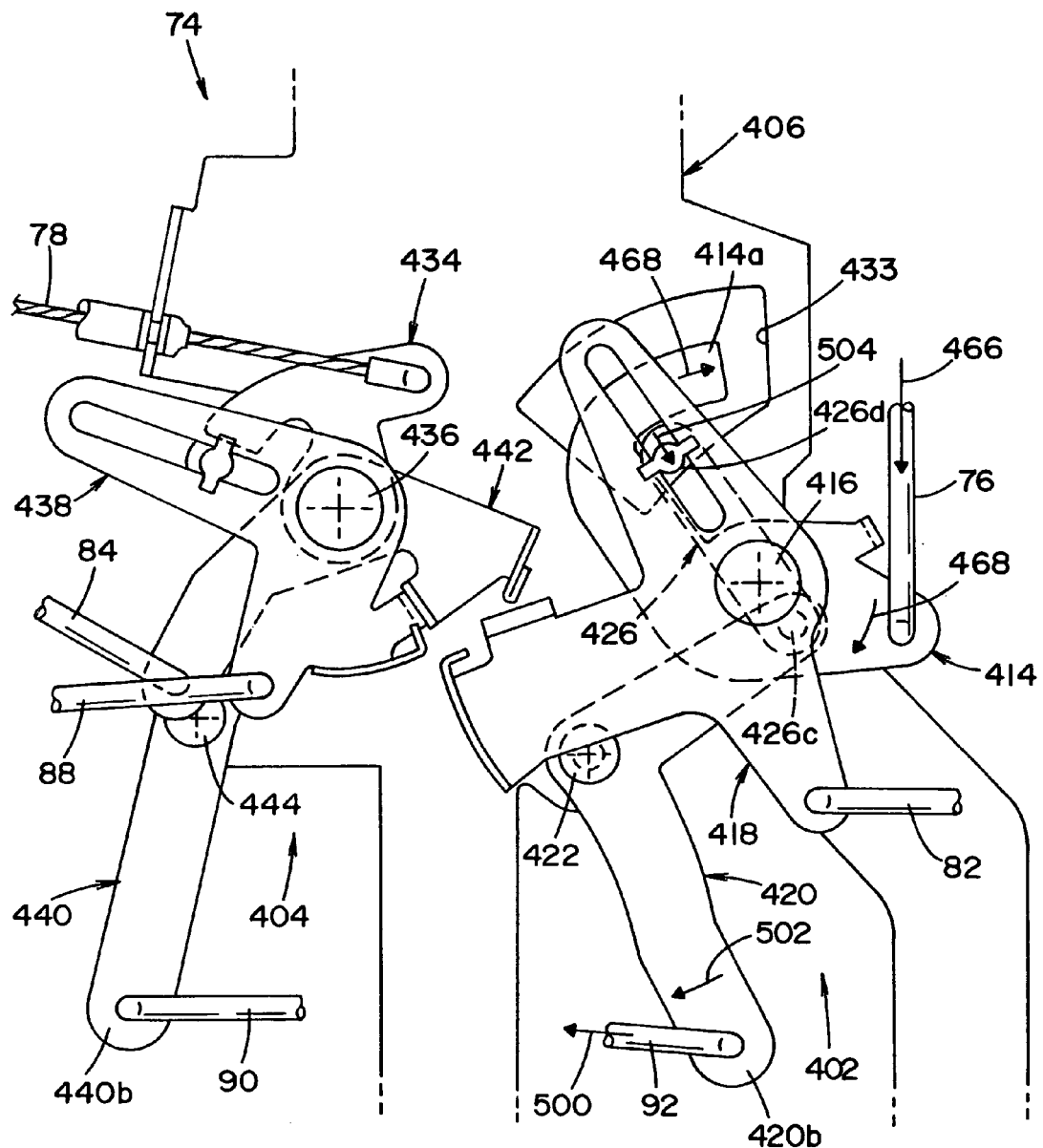
FIG. 31 is a schematic front view of the synchronizer of FIG. 24 shown with the second hinge/lock assembly unlatched and the upper handle being pulled.

As illustrated in FIG. 31, rotation of the lever 414 as represented by arrow 468 does not result in rotation of any other levers. The engaging portion 414a moves by, but does not engage or forcibly move, the pin 426d. Thus, the handle 80 is moveable and its stroke is still communicated to the synchronizer 74, but the synchronizer does not connect movement of the lever 414, which is caused by pulling of the handle 80, with the first hinge/lock lever 418. Only when the sensor rod 92 is returned to the normal position, which returns the pin 426d to its engaging position adjacent the engaging portion 414a, does the handle 80 become operational for purposes of opening the first hinge/lock assembly 44. Of course, the sensor rod 92 only returns to the normal position when the second hinge/lock assembly 50 is re-latched or locked.

If the first hinge/lock assembly 44 is in the unlocked or unlatched position when the handle 86 is pulled, the synchronizer 74 does not connect the stroke of the cable 78 to the rods 84,88 and the lower handle 86 is prevented from opening the tailgate 10. However, as with the upper handle 80, even when prevented from opening the tailgate, the lower handle 86 is still moveable, just not operational. More particularly, as already described with reference to FIG. 28, when the first hinge/lock assembly 44 is unlocked the pin 448d is moved away from the engaging portion 434a along the slot 450. With additional reference to FIG. 32, with the pin 448d moved away form the engaging portion 434a, movement of the lower handle 86 is still permitted and its stroke (represented by arrow 490) is still communicated to the synchronizer through the cable 78. However rotation of the lower handle lever 434 does not result in the unlocking of the second hinge/lock assembly 50 (the first hinge/lock assembly 44 and the locking assembly 62 are assumed to be unlocked in FIG. 32).

Figure 32:
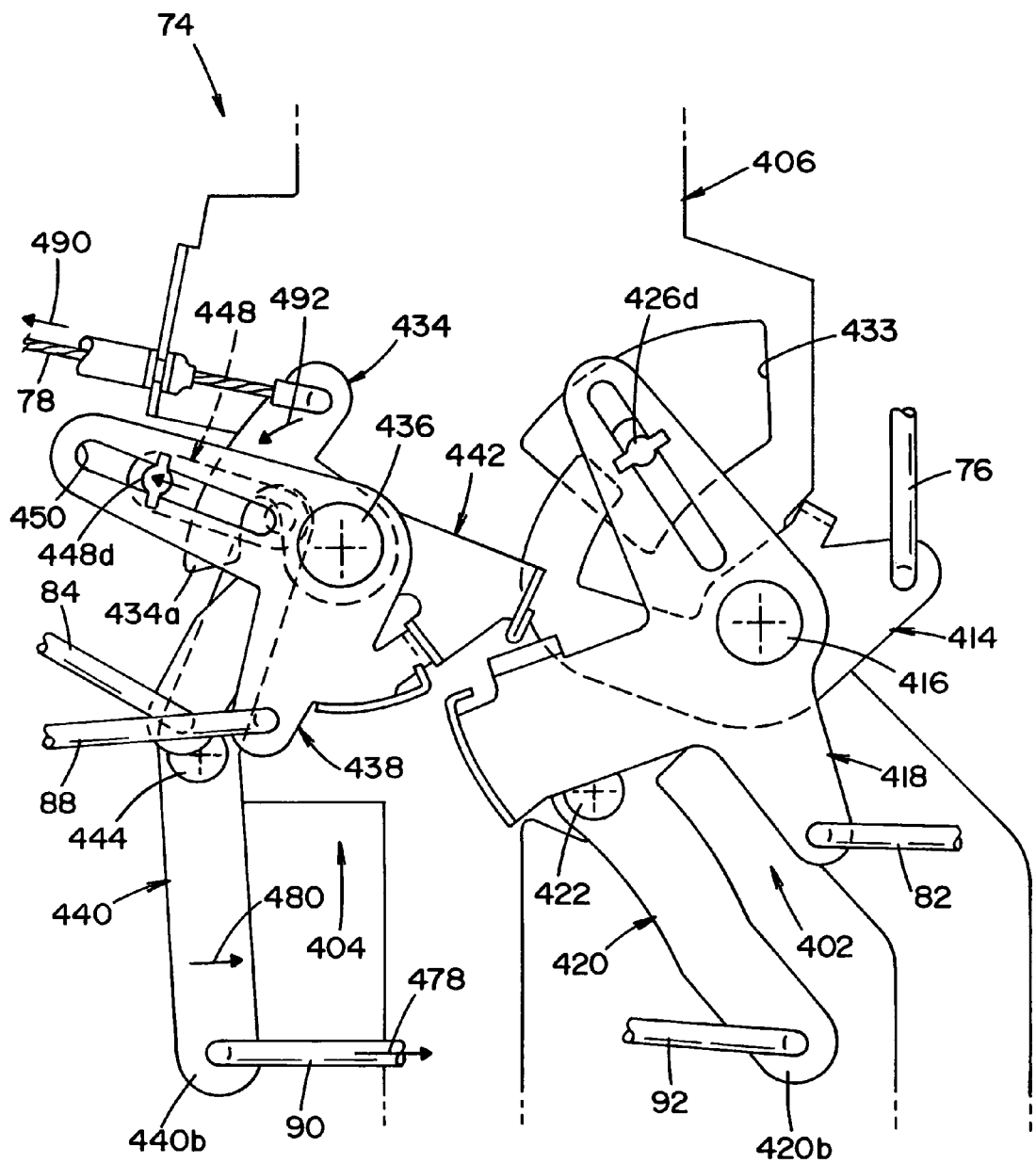
FIG. 32 is a schematic front view of the synchronizer of FIG. 24 shown with the first hinge/lock assembly unlatched and the lower handle being pulled.

As illustrated in FIG. 32, rotation of the lever 434 as represented by arrow 492 does not result in rotation of any other levers. The engaging portion 434a moves by, but does not engage or forcibly move, the pin 448d. Thus, the handle 86 is moveable and its stroke is still communicated to the synchronizer 74, but the synchronizer does not connect movement of the lever 434, which is caused by pulling of the handle 86, with the second hinge/lock assembly 50. Only when the sensor rod 90 is returned to the normal position, which returns the pin 448d to its engaging position adjacent the engaging portion 434a, does the handle 86 become operational for purposes of opening the second/hinge lock assembly 50. Of course, the sensor rod 90 only returns to the normal position when the first hinge/lock assembly 44 is re-latched or locked.

Figure 33:
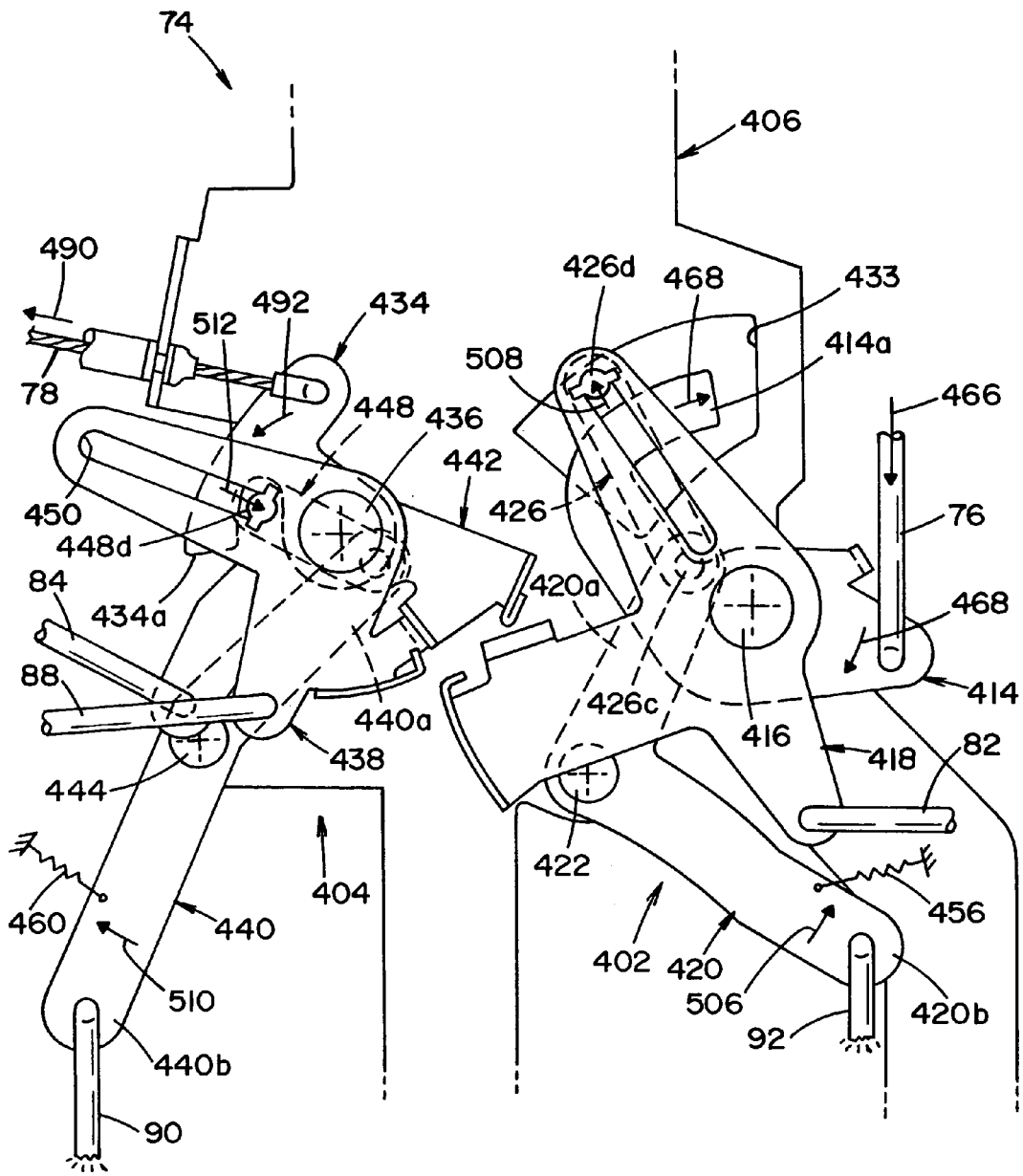
FIG. 33 is a schematic front view of the synchronizer of FIG. 24 shown with the sensor rods 80,92 broken and both the upper and lower handles being pulled.

With reference to FIG. 33, the synchronizer 74 includes a fail safe feature that disables the first and second handles 80,86 in the event of one or both of the sensor rods 90,92 failing or breaking or being disconnected from, respectively, the locking assemblies 44,50 and/or the synchronizer 74. More particularly, if the sensor rod 92 is broken, as illustrated in FIG. 33, the synchronizer 74 does not connect the stroke of the rod 76 to the actuator rods 82,84 and the upper handle 80 is prevented or disabled from opening the tailgate 10. Specifically, if rod 92 fails, the spring 456 rotates the lever 420 in the second rotatable direction, as indicated by arrow 506, (counterclockwise in FIG. 33) and moves the pin 426d, through the pin lever 426, in the direction of arrow 508 to a third position (the position shown in FIG. 33). In the third position, the pin 426d is moved away from the engaging portion 414a along the slot 428 in an opposite direction from the first position than the pin moves when moving to the second position. With the pin 426d moved away from the engaging portion 414a and in the third position, movement of the upper handle 80 is still permitted and its stroke, indicated by arrow 466, is still communicated to the synchronizer 74 through the rod 76. However, rotation of the lever 414, as indicated by arrow 468, does not result in the unlocking of the first hinge/lock assembly 44. As illustrated, rotation of lever 414 causes the engaging portion 414a to move by, but not forcibly engage or move, the pin 426d.

Similarly, if the sensor rod 90 is broken, as illustrated in FIG. 33, the synchronizer 74 does not connect the stroke of the cable 78 to the actuator rods 84,88 and the lower handle 86 is prevented or disabled from opening the tailgate 10. Specifically, if rod 90 fails, the spring 460 rotates the lever 440 in the first rotatable direction, as indicated by arrow 510, (clockwise in FIG. 33) and moves the pin 448d, through the pin lever 448, in the direction of arrow 512 to a third position (the position shown in FIG. 33). In a third position, the pin 448d is moved away from the engaging portion 434a along the slot 450 in an opposite direction from the first position than the pin moves when moving to the second position. With the pin 448d moved away from the engaging portion 434a and in the third position, movement of the lower handle 86 is still permitted and its stroke, as indicated by arrow 490, is still communicated to the synchronizer 74 through the cable 78. However, rotation of the lever 434, as indicated by the arrow 492, does not result in the unlocking of the second hinge/lock assembly 50. As illustrated, rotation of the lever 434 causes the engaging portion 434a to move by, but not forcibly engage or move, the pin 448d.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A lock assembly for selectively locking to a striker on a vehicle, the lock assembly comprising:
   a lock body defining a lock body recess for receiving the striker therein;
   a latch rotatably mounted to said lock body for selectively locking the striker in said lock body recess, said latch moveable between a latched position wherein the striker is locked in said lock body recess and an unlatched position wherein said striker is removable from said lock body recess;
   a ratchet rotatably mounted to said lock body adjacent said latch for selectively locking said latch-in said latched position, said ratchet moveable between an engaged position wherein said ratchet locks said latch in said latched position and a disengaged position wherein said latch is moveable between said latched position and said unlatched position, said ratchet being (a) in said engaged position when locking said latch in said latched position to lock the striker in said lock body recess and (b) in said disengaged position when said latch is one of (i) in said unlatched position and (ii) moveable between said latched position and said unlatched position;
   a first actuator rod rotatably connected to said lock body and configured so that, upon movement of said actuator rod in a first direction, said ratchet is moved from said engaged position to said disengaged position;
   a second sensor rod rotatably connected to said lock body and configured so that said sensor rod moves between a first position corresponding to said ratchet engaged position and a second position corresponding to said ratchet disengaged position; and
   a synchronizer connected to each of said actuator rod and said sensor rod, said sensor rod extending between said ratchet and said synchronizer and mechanically communicating to the synchronizer that the striker is locked in said lock body recess when said sensor rod is in said first position and further mechanically communicating to the synchronizer that said striker is unlocked from said lock body recess when said sensor rod is in said second position, said actuator rod extending between said ratchet and said synchronizer and selectively movable into said first position by said synchronizer when a handle connected to said synchronizer is actuated.

2. The lock assembly of claim 1 wherein said latch includes a catch surface and said ratchet includes an opposing catch surface, said ratchet in said engaged position when said opposing catch surface engages said catch surface thereby holding said latch in said latched position.

3. The lock assembly of claim 1 further including:
   a latch biasing means urging said latch to rotate in a first rotatable direction toward said unlatched position; and
   a ratchet biasing means urging said ratchet to rotate in a second rotatable direction toward said engaged position.

4. The lock assembly of claim 3 wherein said latch biasing means and said ratchet biasing means are torsion springs.

5. The lock assembly of claim 3 wherein movement of the striker into said lock body recess rotates said latch in said second rotatable direction against said urging of said latch biasing means which allows said ratchet to be urged into said engaged position wherein an opposing catch surface of said ratchet moves into said latch and engages a catch surface of said latch to lock said latch in said latched position.

6. The lock assembly of claim 1 further including:
   a first actuator lever rotatably mounted to said lock body, said actuator lever having a first leg engaging said ratchet when said actuator rod is moved to move said ratchet from said engaged position to said disengaged position and a second leg pivotally connected to said actuator rod; and
   a second sensor lever rotatably mounted to said lock body, said sensor lever having a first leg engaged by said ratchet when said ratchet moves to said disengaged position to move said sensor rod to said second position and a second leg pivotally connected to said sensor rod.

7. The lock assembly of claim 6 wherein said ratchet includes a pin extending in a direction generally parallel to an axis of rotation of said ratchet, a portion of said pin extending in said direction engages said sensor lever first leg and is engaged by said actuator lever first leg.

8. The lock assembly of claim 7 wherein said sensor lever first leg defines a recess for receiving said portion of said pin, said pin moving said sensor lever when said ratchet moves so that said sensor lever moves to a sensor lever first position when said ratchet is in said engaged position and a sensor lever second position when said ratchet is in said disengaged position.

9. The lock assembly of claim 1 wherein said lock body is mounted to a closure and the striker is mounted to a vehicle body to which said closure is selectively locked.

10. The lock assembly of claim 9 wherein said closure is a tailgate and the striker is mounted to a portion of said vehicle body defining an open end of a load-carrying bed.

11. The lock assembly of claim 10 wherein said tailgate is a dual-mode tailgate and said lock body is pivotally moveable about the striker when said latch is locking the striker in said lock body recess and said tailgate is opened about an axis defined by the striker.

* * * * *